(12) United States Patent
Sasaki et al.

(10) Patent No.: US 6,518,736 B2
(45) Date of Patent: Feb. 11, 2003

(54) MECHANICAL POWER OUTPUTTING APPARATUS AND INVERTER APPARATUS

(75) Inventors: Shoichi Sasaki, Okazaki (JP);
Sumikazu Shamoto, Nagoya (JP);
Masayuki Komatsu, Aichi-gun (JP);
Kazunari Moriya, Aichi (JP); Hiroki Ohtani, Aichi (JP); Yukio Inaguma, Aichi (JP)

(73) Assignees: Toyota Jidosha Kabushiki Kaisha, Toyota (JP); Kabushiki Kaisha Toyota Chuo Kenkyusho, Aichi-gun (JP)

(*) Notice: Subject to any disclaimer, the term of this patent is extended or adjusted under 35 U.S.C. 154(b) by 43 days.

(21) Appl. No.: 09/882,184

(22) Filed: Jun. 18, 2001

(65) Prior Publication Data

US 2002/0070715 A1 Jun. 13, 2002

(30) Foreign Application Priority Data

Jun. 26, 2000 (JP) .......................... 2000-190443
Jun. 28, 2000 (JP) .......................... 2000-194107
Jun. 30, 2000 (JP) .......................... 2000-199787

(51) Int. Cl.$^7$ ............................................... H02K 7/00
(52) U.S. Cl. .................... 322/16; 322/28; 290/40 C; 318/9
(58) Field of Search ................. 290/39, 40 C; 322/14, 16, 28, 36; 318/9, 87, 98

(56) References Cited

U.S. PATENT DOCUMENTS

| | | | | |
|---|---|---|---|---|
| 5,225,712 | A | * 7/1993 | Erdman ...................... | 290/44 |
| 5,907,191 | A | * 5/1999 | Sasaki et al. ................ | 290/16 |
| 5,942,862 | A | * 8/1999 | Yamada et al. ............. | 180/65.3 |
| 6,384,558 | B2 | * 5/2002 | Yoshida et al. ............. | 318/441 |
| 2001/0026141 | A1 | * 10/2001 | Hirata et al. ............... | 318/727 |
| 2002/0105300 | A1 | * 11/2001 | Moriya et al. .............. | 318/727 |
| 2002/0070715 | A1 | * 6/2002 | Sasaki et al. ............... | 322/28 |

FOREIGN PATENT DOCUMENTS

| | | |
|---|---|---|
| JP | 5-207782 | 8/1993 |
| JP | 10-337047 | 12/1998 |
| JP | 10-337087 | 12/1998 |
| JP | 11-55950 | 2/1999 |
| JP | 11-55961 | 2/1999 |
| JP | 11-178114 | 7/1999 |

OTHER PUBLICATIONS

U.S. patent application Ser. No. 09/818,588, Shamoto et al., filed Mar. 28, 2001.
U.S. patent application Ser. No. 09/887,016, Shamoto et al., filed Jun. 25, 2001.

* cited by examiner

Primary Examiner—Nicholas Ponomarenko
(74) Attorney, Agent, or Firm—Oliff & Berridge, PLC

(57) ABSTRACT

A direct-current power supply connecting the negative pole bus of an inverter circuit and the neutral point of a motor and a capacitor connecting the positive pole bus of the inverter circuit and the neutral point of the motor are provided for performing the switching control of the transistors T1–T6 of the inverter circuit on the basis of a phase voltage command value formed by the addition of a direct-current component and an alternating-current component. The voltage between the terminals of the capacitor is controlled on the direct-current component, and the driving control of the motor is performed on the alternating-current component. The supply voltage of the direct-current power supply can be made to be lower than a voltage necessary to drive the motor. Moreover, the withstand voltage of the capacitor can be made to be smaller and the relay circuit can be simplified in comparison with an apparatus equipped with a capacitor connected between the positive pole bus and the negative pole bus of an inverter circuit. As a result, the downsizing of an apparatus and the reduction in costs can be achieved, and the durability and the reliability of the apparatus can be improved.

8 Claims, 37 Drawing Sheets

MECHANICAL POWER OUTPUTTING APPARATUS AND INVERTER APPARATUS

BACKGROUND OF THE INVENTION

1. Field of the Invention

The present invention relates to a mechanical power outputting apparatus.

2. Description of the Related Art

Conventionally, there has been proposed a mechanical power outputting apparatus of this type that is equipped with a capacitor connected with a positive pole bus and a negative pole bus of an inverter circuit that imposes a three-phase alternating current on a dynamo-electric motor, and the mechanical power outputting apparatus is also equipped with a direct-current power supply connected with the positive pole bus or the negative pole bus of the inverter circuit and a neutral point of the dynamo-electric motor (see for example, Japanese Laid-Open Patent Publication No. Hei 10-337047, Japanese Laid-Open Patent Publication No. Hei 11-178114, and the like). The apparatus regards a circuit constituted of the coil of each phase of the dynamo-electric motor and a switching element of each phase of the inverter as a boosting chopper circuit that stores electric charge in the capacitor by boosting the voltage of the direct-current power supply. Besides, the apparatus regards the charged capacitor as the direct-current power supply for driving the dynamo-electric motor. The control of the driving of the dynamo-electric motor and the control of the charging to the capacitor are simultaneously performed by the switching actions of the switching elements of the inverter circuit that are performed at the time of the imposition of the three-phase alternating current on the dynamo-electric motor.

However, because such a mechanical power outputting apparatus drives the dynamo-electric motor with the boosted and charged capacitor that is regarded as the direct-current power supply, an actually used direct-current power supply may be one supplying a lower voltage than a voltage necessary for driving the dynamo-electric motor, but the capacitor is required to have a high withstand voltage. The high withstand voltage capacitor is large in size and high in cost, and further that causes the increase of the size and the cost of the mechanical power outputting apparatus.

Moreover, the conventional mechanical power outputting apparatus can drive a single dynamo-electric motor with the direct-current power supply of a low voltage, but it is difficult for the conventional mechanical power outputting apparatus to drive a plurality of dynamo-electric motors separately with the direct-current power supply of the low voltage.

Moreover, the conventional mechanical power outputting apparatus has a probability of a large current pulsation being generated in the current that flows into or flows out from the neutral point of the dynamo-electric motor to increase the loss of the dynamo-electric motor. In a pseudo-three-phase alternating current formed by pulse width modulation (PWM) control using two voltage levels of a positive voltage and a negative voltage, a so-called zero voltage vector output state arises in which each phase voltage is the same. When the zero voltage vector is output, because the potential at the neutral point of the dynamo-electric motor is fixed by the direct-current power supply, a large current flows through a neutral point-connected line of the dynamo-electric motor. Because the zero voltage vector takes two states, i.e. a state that any phase takes a positive voltage and a state that any phase takes a negative voltage, the direction of the current flowing through the neutral point-connected line of the dynamo-electric motor differs depending on which state the zero voltage vector is based. As a result, the large current pulsation is generated on the neutral point-connected line of the dynamo-electric motor.

SUMMARY OF THE INVENTION

An object of the present invention is to make a mechanical power outputting apparatus small in size and cheap in cost, and to improve the durability thereof and the stability thereof.

In a mechanical power outputting apparatus of the present invention, an electric power supplying section as a direct-current power supply is connected with either the positive pole bus or the negative pole bus of an inverter circuit, and the electric power supplying section is also connected with the neutral point of a dynamo-electric motor, and a charging section capable of charging and discharging is connected with the other bus between the positive pole bus and the negative pole bus of the inverter circuit that is not connected with the electric power supplying section, and the charging section is also connected with the neutral point of the dynamo-electric motor. Consequently, the electric power supplying section and the charging section connect the positive pole bus and the negative pole bus of the inverter circuit in series, and then it is possible to drive the dynamo-electric motor on the supposition that the electric power supplying section and the charging section are an integrated direct-current power supply. A circuit constituted of the coil of each phase of the dynamo-electric motor and a switching element of each phase of the inverter circuit can charge the charging section by the use of the electric power of the electric power supplying section by means of the switching operation of the switching element, and the charging of the charging section and the driving of the dynamo-electric motor can be performed simultaneously by synchronization of the switching operation with the switching operation at the time of the driving of the dynamo-electric motor. Moreover, because the withstand voltage of the charging section is a value that is a result of the subtraction of the voltage of the electric power supplying section from a voltage necessary for driving the dynamo-electric motor, the withstand voltage of the charging section can be lower than the withstand voltage of a capacitor connected with the positive pole bus and the negative pole bus of the inverter circuit. As a result, the charging section can be realized to be small in size and cheap in cost, namely the mechanical power outputting apparatus can be realized to be small in size and cheap in cost, and further the durability and the stability of the mechanical power outputting apparatus can be improved because the charging section is made to have a low withstand voltage.

Moreover, in the mechanical power outputting apparatus of another aspect of the present invention, a circuit constituted of the coil of each phase of a first dynamo-electric motor that performs the rotation thereof and the driving thereof by a polyphase alternating current and a switching element of each phase of a first inverter circuit can be regarded as a circuit that boosts the voltage of a first electric power supplying section by means of the electric power of the electric power supplying section to store charge in a charging section, and further the charging section can be regarded as a direct-current power supply capable of driving the first dynamo-electric motor and a second dynamo-electric motor. That is, the circuit constituted of the coil of each phase of the first dynamo-electric motor and the switching element of each phase of the first inverter circuit can charge the charging section by the use of the electric power of the first electric power supplying section by means of the switching operation of the switching elements of the first inverter circuit, and the charging of the charging section and the driving of the first dynamo-electric motor can be performed simultaneously by synchronization of the switching operation with the switching operation at the time of the driving of the first dynamo-electric motor. Still further, the second dynamo-electric motor can be driven to rotate by the switching operation of the switching elements of the second inverter circuit by means of the electric power stored in the charging section. Moreover, because the switching operation of the first inverter circuit and the switching operation of the second inverter circuit can be performed separately, the first dynamo-electric motor and the second dynamo-electric motor can be driven separately. That is, a plurality of dynamo-electric motors can separately be driven by the use of the electric power supplying section of a low voltage.

According to the mechanical power outputting apparatus of still another aspect of the present invention, a driving current is made to be a pseudo-polyphase alternating current of voltage levels of three steps or more, i.e. voltage levels of a positive voltage, a negative voltage, and an intermediate voltage in between these two, and consequently the probability of the appearance of the zero voltage vector where the voltage of each of the phases are the same voltage, but different from the voltage of a second power supply, can be largely decreased, and the probability of the appearance of current pulsations that can be generated at the neutral point of a dynamo-electric motor can be decreased. As a result, the loss of the dynamo-electric motor can be suppressed.

According to the mechanical power outputting apparatus of a yet another aspect of the present invention, a driving current is made to be a pseudo-polyphase alternating current of voltage levels of three steps or more, and consequently the probability of the appearance of the zero voltage vector, the voltage of each phase of which is the same voltage but different from the voltage of a second power supply, can be largely decreased, and the probability of the appearance of current pulsations that can be generated at the neutral point of a dynamo-electric motor can be decreased. As a result, the loss of the dynamo-electric motor can be suppressed.

According to the mechanical power outputting apparatus of a further aspect of the present invention, the switching of a plurality of switching elements in an inverter circuit is controlled on the basis of the modulated wave of each phase based on the voltage command of each phase of a polyphase alternating current and on the basis of the carrier wave of each phase having a prescribed phase difference between each other corresponding to each phase of the polyphase alternating current, and consequently the probability of the appearance of the zero voltage vector, the voltage of each phase of which is exactly the same voltage but different from the voltage of a second power supply, can be largely decreased, and the probability of the appearance of current pulsations that can be generated at the neutral point of a dynamo-electric motor can be decreased. As a result, the loss of the dynamo-electric motor can be suppressed.

According to the mechanical power outputting apparatus of a still further aspect of the present invention, the switching of a plurality of switching elements in an inverter circuit is controlled on the basis of the modulated wave of each phase based on the voltage command of each phase of a polyphase alternating current and on the basis of the carrier wave of each phase having a prescribed phase difference between each other corresponding to each phase of the polyphase alternating current, and consequently the probability of the appearance of the zero voltage vector the voltage of each phase of which is the same voltage can be decreased, and the probability of the appearance of current pulsations that can be generated at the neutral point of a dynamo-electric motor can be decreased. As a result, the loss of the dynamo-electric motor can be suppressed.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DESCRIPTION OF THE PREFERRED EMBODIMENTS

EMBODIMENT 1

Figure 1:
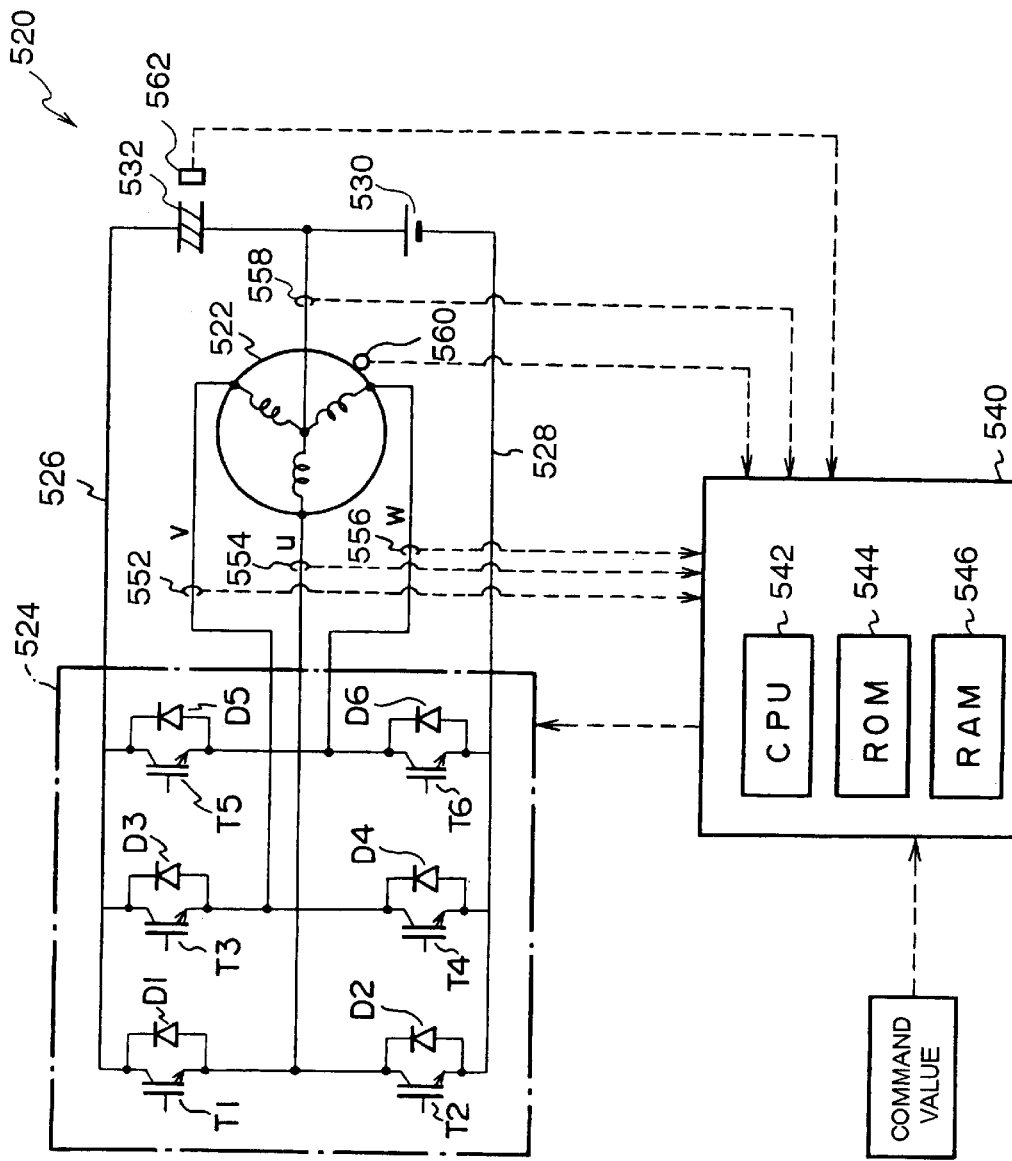
FIG. 1 is a schematic diagram showing an outline of the configuration of a mechanical power outputting apparatus 520 that is a first embodiment (embodiment 1) of the present invention.

Next, the present invention will be described by the use of the embodiment 1 thereof. FIG. 1 is the schematic diagram showing the configuration of the mechanical power outputting apparatus 520 that is the embodiment 1 of the present invention. The mechanical power outputting apparatus 520 of the embodiment 1 comprises, as shown in FIG. 1, the motor 522 driven to rotate by a three-phase alternating current, the inverter circuit 524 capable of converting direct-current power into three-phase alternating-current power for supply to the motor 522, a direct-current power supply 530 connected between the negative pole bus 528 of the inverter circuit 524 and the neutral point of the motor 522, a capacitor 532 connected between the positive pole bus 526 of the inverter circuit 524 and the neutral point of the motor 522, and the electronic control unit 540 for controlling the whole apparatus.

The motor 522 is composed as a synchronous generation dynamo-electric motor capable of generating electrical energy, which is composed of, for example, a rotor having a permanent magnet affixed on the outer surface and a stator on which three-phase coils are wound. The rotating shaft of the motor 522 is set as the output shaft of the mechanical power outputting apparatus 520 of the embodiment 1, and mechanical power is output from the rotating shaft. Incidentally, because the motor 522 of the embodiment 1 is composed as a generating dynamo-electric motor, if mechanical power is input into the rotating shaft of the motor 522, it is possible to generate electrical energy with the motor 522.

The inverter circuit 524 is composed of six transistors T1–T6 and six diodes D1–D6. The six transistors T1–T6 are disposed in three pairs of two between the positive pole bus 526 and the negative pole bus 528 so that one of the paired transistors is on the source side and the other of them is on the sink side, respectively, and each of the three-phase coils (u, v and w) of the motor 522 is connected with each of the connection points of the pairs. Accordingly, if the ratios of the periods of time when the paired transistors T1–T6 are turning on are controlled such that voltages operate on the positive pole bus 526 and the negative pole bus 528, the three-phase coils of the motor 522 form a rotating magnetic field that can drive the motor 522 to rotate.

The electronic control unit 540 is composed as a microprocessor centering on a central processing unit (CPU) 542, and the electronic control unit 540 comprises a read only memory (ROM) 544 that stores a processing program, a random access memory (RAM) 546 that stores data temporarily and an input/output port (not shown). Into the electronic control unit 540, there are input through the input port the current of each phase from current sensors 552, 554 and 556 attached to each phase of the three-phase coils (u, v and w) of the motor 522, the neutral point current from a current sensor 558 attached to the neutral point of the motor 522, the rotation angle of the rotor of the motor 522 from a rotation angle sensor 560 attached to the rotating shaft of the motor 522, the voltage Vc between terminals of the capacitor 532 from a voltage sensor 562 attached to the capacitor 532, command values concerning the action of the motor 522, and the like. Here, any one of the current sensors 552, 554, 556 and 558 can be omitted, and any one of them may be used as a sensor for abnormal detection use only. Moreover, from the electronic control unit 540, there are output, through the output port, control signals for performing the switching control of the transistors T1–T6 of the inverter circuit 524, and the like.

Figure 2:
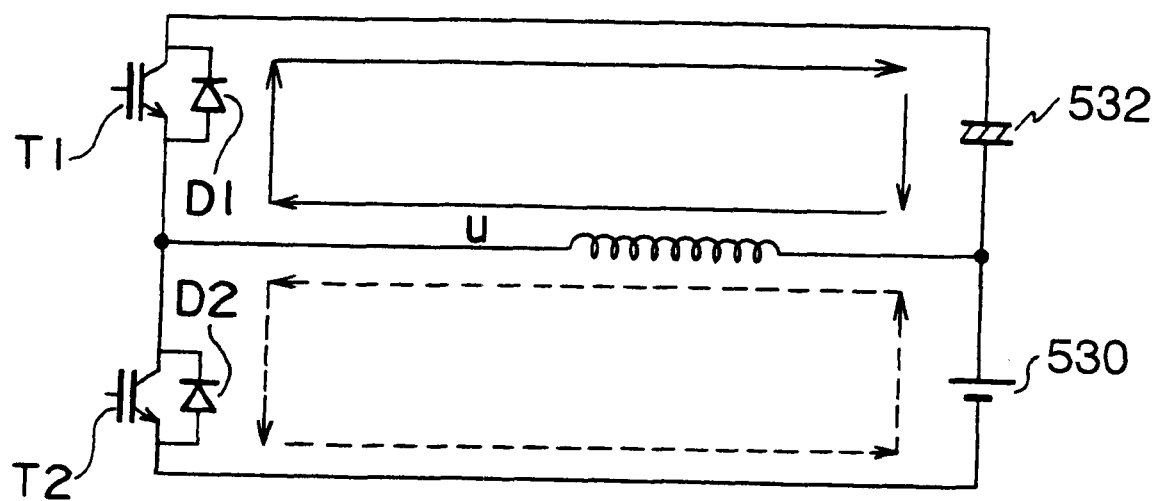
FIG. 2 is a circuit diagram of the mechanical power outputting apparatus 520 of the embodiment 1 when the leakage inductance of the three-phase coils of a motor 522 is featured.

FIG. 2 is the circuit diagram of a part of the mechanical power outputting apparatus 520 of the embodiment 1 when the leakage inductances of the three-phase coils of the motor 522 are featured. Now, when a state in which the transistor T2 is turned on is considered, a short circuit shown by the broken arrows in the figure is formed, and the u-phase of the three-phase coils of the motor 522 functions as a reactor. When the transistor T2 is turned off, the energy that is stored in the u-phase of the three-phase coils that functions as a reactor is stored in the capacitor 532 through the charging circuit shown by the solid arrows in the figure. Consequently, the circuit can be regarded as a chopper circuit for storing the energy of the direct-current power supply 530 in the capacitor 532. Because the v-phase and the w-phase of the three-phase coils of the motor 522 can also be regarded as a chopper circuit like the u-phase thereof, the capacitor 532 can be charged by the execution of the turning on and off of the transistors T2, T4 and T6.

With such charging, a potential difference is generated between the terminals of the capacitor 532, and the potential difference can be controlled by the adjustment of the quantity of the charge stored in the capacitor 532, i.e. the current flowing through the reactors. Consequently, the voltage Vc between the terminals of the capacitor 532 can also be made to be equal to the supply voltage Vb of the direct-current power supply 530. If the voltage Vc between the terminals of the capacitor 532 is thus made to be equal to the supply voltage Vb of the direct-current power supply 530, the mechanical power outputting apparatus 520 shown in FIG. 1 is in a state where a direct-current power supply that is comprised of the direct-current power supply 530 and the capacitor 532, and that has a voltage being twice as large as the supply voltage Vb of the direct-current power supply 530, is connected between the positive pole bus 526 and the negative pole bus 528. Then, the motor 522 can be driven in conformity with the switching control of the transistors T1–T6.

Because a pseudo-three-phase alternating current can be supplied to the three-phase coils of the motor 522 by the switching control of the transistors T1–T6 that compose the inverter circuit 524, a direct-current component can also be added to the three-phase alternating current. That is, the electrical potential of the pseudo-three-phase alternating current is offset to the plus side or to the minus side. If the three-phase alternating current including the direct-current component is supplied to the motor 522, the motor 522 can be driven to rotate by the alternating-current component, and the capacitor 532 can be charged by the direct-current component as described by the use of FIG. 2. That is, it is possible to charge the capacitor 532 at the same time as driving the motor 522. The voltage Vc between the terminals of the capacitor 532 can be controlled by the adjustment of the magnitude of the direct current component in this case.

Figure 3:
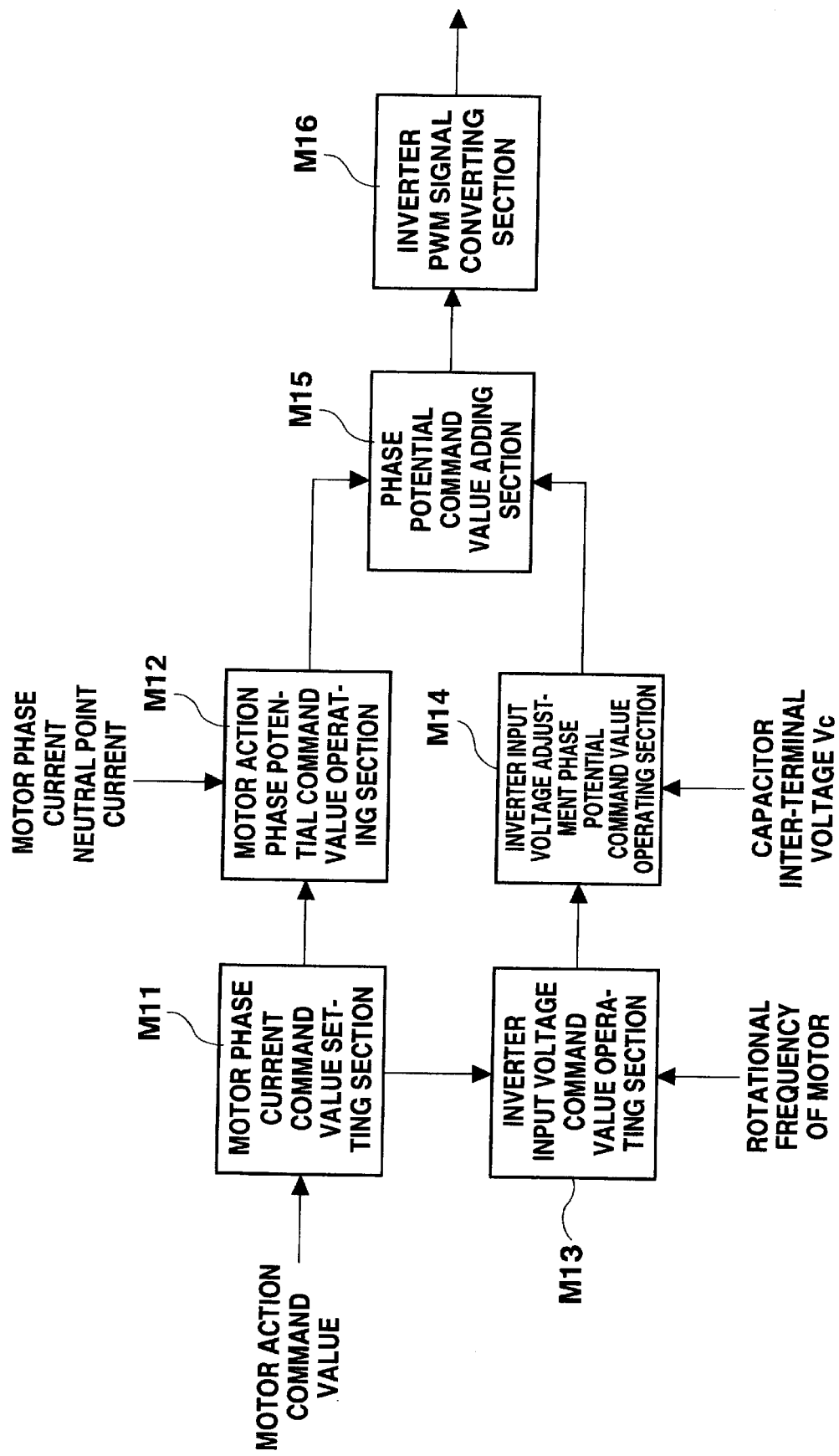
FIG. 3 is an explanatory view illustrating an example of an operation block when a control signal output to an inverter circuit 524 by an electronic control unit 540 of the mechanical power outputting apparatus 520 of the embodiment 1 is operated.

Next, the operation of the mechanical power outputting apparatus 520 of the thus structured embodiment 1 will be described. FIG. 3 is the explanatory view for illustrating an example of the operation blocks when a control signal output to the inverter circuit 524 by the electronic control unit 540 of the mechanical power outputting apparatus 520 of the embodiment 1 is operated. As shown in the figure, the operation blocks are constituted of a motor phase current command value setting section M11 for setting a phase current command value of the motor 522 on the basis of an input motor action command value, a motor action phase potential command value operating section M12 for operating a phase potential command value for the action of the motor 522 (the phase potential command value of the alternating-current component) on the basis of each phase current of the motor 522 from the current sensors 552, 554 and 556, a neutral point current from the current sensor 558, and a motor phase current command value, an inverter input voltage command value operating section M13 for operating an inverter input voltage command value as a voltage command value between the positive pole bus 526 and the negative pole bus 528 of the inverter circuit 524 on the basis of the rotational frequency of the rotor of the motor 522 obtained on the basis of the rotation angle from the rotation angle sensor 560 and the motor phase current command value, an inverter input voltage adjustment phase potential command value operating section M14 for setting a phase potential command value for adjusting an inverter input voltage (the phase potential command value of the direct-current component) on the basis of the voltage Vc between the terminals of the capacitor 532 from the voltage sensor 562 and the inverter input voltage command value, a phase potential command value adding section M15 for adding the phase potential command value for the motor action as the alternating-current component and the phase potential command value for adjusting the inverter input voltage as the direct-current component, and an inverter PWM signal converting section M16 for converting the phase potential command value obtained by the addition of the alternating-current component and the direct-current component into a PWM signal. The control of the voltage Vc between the terminals of the capacitor 532 and the drive control of the motor 522 are carried out at the same time by such operation blocks.

According to the mechanical power outputting apparatus 520 of the embodiment 1 described above, the voltage Vc between the terminals of the capacitor 532 can be controlled and the driving control of the motor 522 can be performed by the switching control of the transistors T1–T6 of the inverter circuit 524. Moreover, because the positive pole bus 526 and the negative pole bus 528 of the inverter circuit 524 are connected in series with the direct-current power supply 530 and the capacitor 532, the supply voltage Vb of the direct-current power supply 530 can be made to be lower than a voltage necessary to drive the motor 522.

Moreover, according to the mechanical power outputting apparatus 520 of the embodiment 1, the following advantages are obtained in comparison with the conventional mechanical power outputting apparatus equipped with a capacitor connected between the positive pole bus 526 and the negative pole bus 528 of the inverter circuit 524.

First, because, in the mechanical power outputting apparatus 520 of the embodiment 1, the capacitor 532 is connected between the positive pole bus bar 526 of the inverter circuit 524 and the neutral point of the motor 522, the withstand voltage of the capacitor 532 can be smaller than that of the conventional mechanical power outputting apparatus. Moreover, the mechanical power outputting apparatus 520 of the embodiment 1 has an advantage that the initial charging at the time of starting the system that is necessary for the conventional mechanical power outputting apparatus is unnecessary. The conventional mechanical power outputting apparatus often separates the direct current power supply thereof from the system completely, for the purpose of ensuring safety and so forth at the time of the non-use of the system. For the start of the system from the state where the direct-current power supply is thus separated from the system, for the prevention of the initial charging by a large current of the capacitor connected in parallel with the direct-current power supply at the time of the connection of the direct-current power supply, the starting of the system is required to be performed to have a first step of performing the initial charging of the capacitor with a limiting resistor and a second step of performing the connection of the direct-current power supply with the system. Consequently, the conventional mechanical power outputting apparatus needs the limiting resistor and a relay.

Because the direct-current power supply 530 and the capacitor 532 are connected in series in the mechanical power outputting apparatus 520 of the embodiment 1, the initial charging by the large current of the capacitor 532 is not caused like the conventional mechanical power outputting apparatus. Consequently, the mechanical power outputting apparatus 520 of the embodiment 1 does not need to be equipped with the limiting resistor and the relay that the conventional mechanical power outputting apparatus needs. As a result, the mechanical power outputting apparatus 520 of the embodiment 1 can improve its features to be small in size, cheap in cost, excellent in durability, superior in stability, rapid in starting, and the like in comparison with the conventional mechanical power outputting apparatus.

Figure 4:
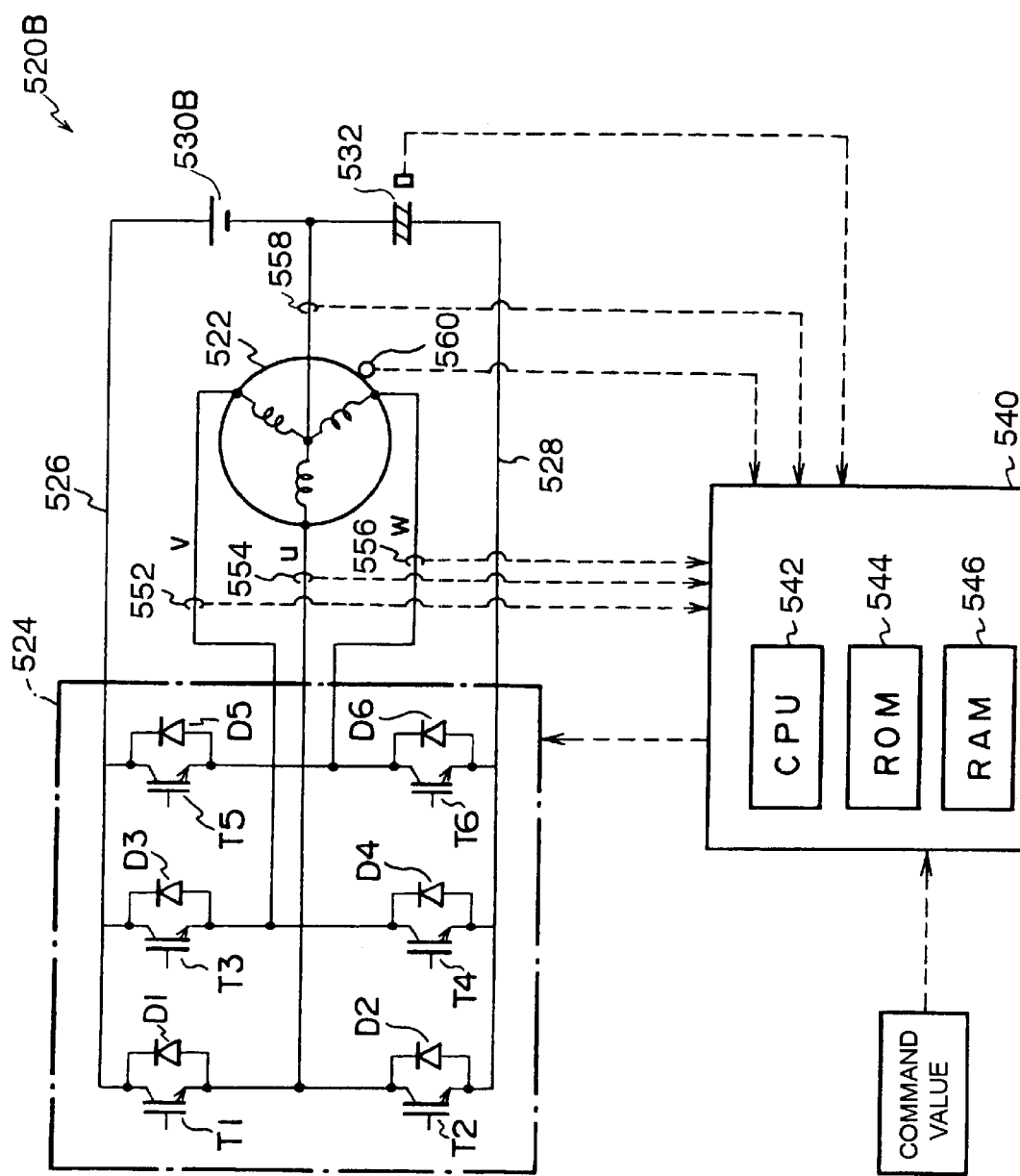
FIG. 4 is a schematic diagram showing an outline of the configuration of a modified mechanical power outputting apparatus 520B.

Although, in the mechanical power outputting apparatus 520 of the embodiment 1, the direct-current power supply 530 is connected between the negative pole bus 528 of the inverter circuit 524 and the neutral point of the motor 522 and the capacitor 532 is connected between the positive pole bus 526 of the inverter circuit 524 and the neutral point of the motor 522, a direct-current power supply 530B may be connected between the positive pole bus 526 of the inverter circuit 524 and the neutral point of the motor 522 and a capacitor 532B may be connected between the negative pole bus 528 of the inverter circuit 524 and the neutral point of the motor 522, like the modified mechanical power outputting apparatus 520B shown in FIG. 4. The modified mechanical power outputting apparatus 520B can also control the voltage Vc between the terminals of the capacitor 532B and can perform the driving control of the motor 522 by the switching control of the transistors T1–T6.

Figure 5:
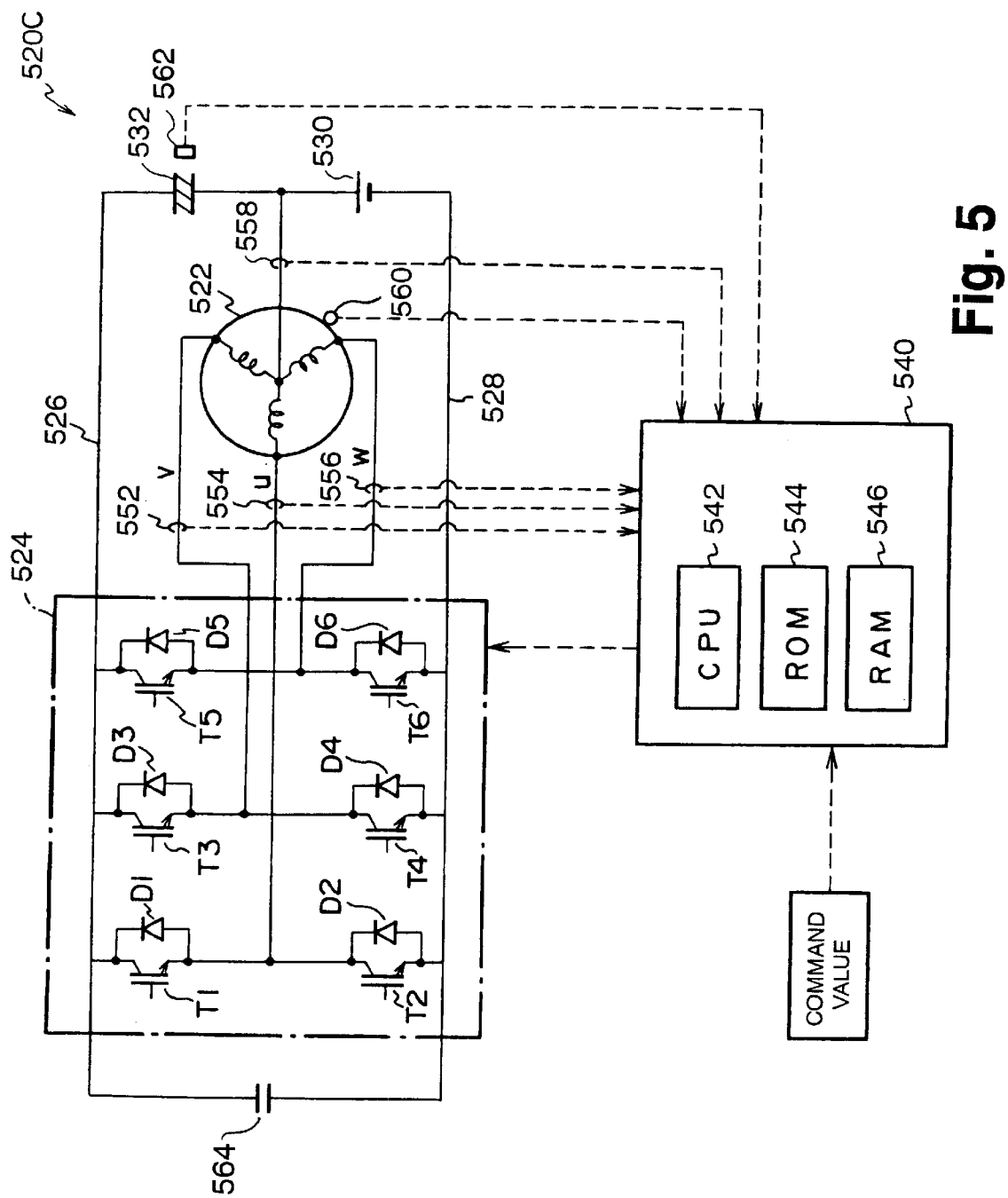
FIG. 5 is a schematic diagram showing an outline of the configuration of another modified mechanical power outputting apparatus 520C.

Moreover, although, in the mechanical power outputting apparatus of the embodiment 1 and the modified mechanical power outputting apparatus 520B, the positive pole bus 526 and the negative pole bus 528 of the inverter circuit 524 are connected in series with the direct-current power supply 530 or 530B and the capacitor 532 or 532B, a capacitor 564 connecting the positive pole bus 526 and the negative pole bus 528 may be provided as the modified mechanical power outputting apparatus 520C shown in FIG. 5. By a such structure of the apparatus, the surge absorption to the transistors T1–T6 can be rapidly performed. Incidentally, if the capacitor 564 is used as a capacitor for the surge absorption of the transistors T1–T6, the capacitance thereof may be very small, but if it is used as a capacitor for storing energy, like the capacitors 532 and 532B, the capacitance thereof becomes large.

EMBODIMENT 2

Figure 6:
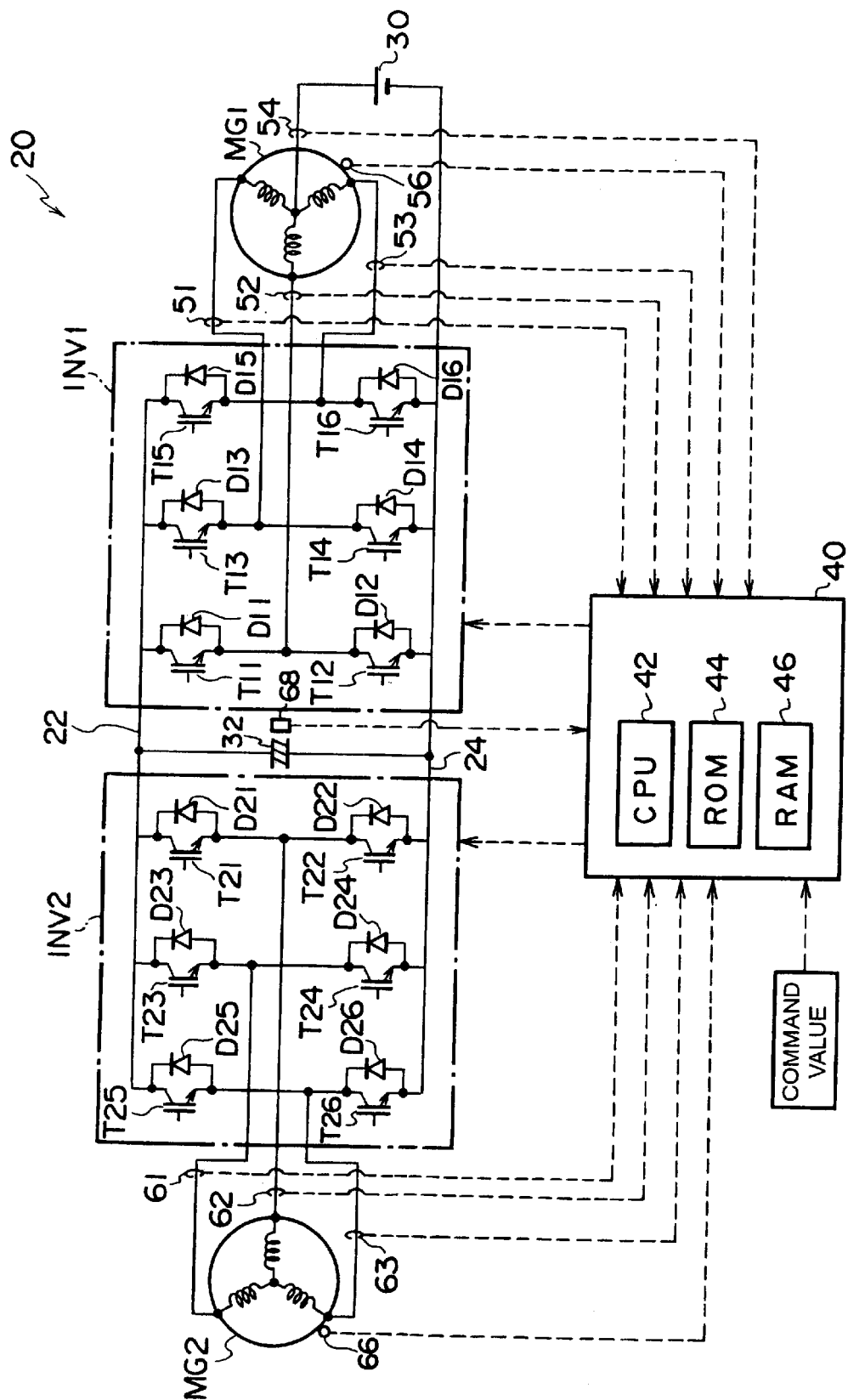
FIG. 6 is a schematic diagram showing an outline of the configuration of a mechanical power outputting apparatus 20 that is a second embodiment (embodiment 2) of the present invention.

FIG. 6 is a schematic diagram showing the outline of the configuration of the mechanical power outputting apparatus 20 that is the embodiment 2 of the present invention. The mechanical power outputting apparatus 20 of the embodiment 2 comprises, as shown in the figure, a motor MG1 driven to rotate by a three-phase alternating current, an inverter circuit INV1 capable of converting direct-current power into three-phase alternating-current power for supply to the motor MG1, a motor MG2 driven to rotate by a three-phase alternating current, an inverter circuit INV2 capable of converting direct-current power into three-phase alternating-current power for supply to the motor MG2, a direct-current power supply 30 connected between a negative pole bus 24 of the inverter circuit INV1 and the inverter circuit INV2 and the neutral point of the motor MG1, a capacitor 32 connected between a positive pole bus 22 of the inverter circuit INV1 and the inverter circuit INV2 and the negative pole bus 24, and an electronic control unit 40 to control the whole apparatus.

Both of the motors MG1 and MG2 are composed as a synchronous generation dynamo-electric motor that is capable of generating electrical energy and is constituted of, for example, a rotor having a permanent magnet affixed on the outer surface and a stator on which three-phase coils are wound. The rotating shaft of the motor MG1 is set as the outputting shaft of the mechanical power outputting apparatus 20 of the embodiment 2, and mechanical power is output from the rotating shaft. The rotating shaft of the motor MG2 is indirectly connected with the outputting shaft of the mechanical power outputting apparatus 20 of the embodiment 2, and the mechanical power from the motor MG2 can also be indirectly output to the outputting shaft of the mechanical power outputting apparatus 20. Incidentally, because the motors MG1 and MG2 of the embodiment 2 are composed as a generating dynamo-electric motor, if mechanical power is input into the rotating shafts of the motors MG1 and MG2, it is possible to generate electrical energy with the motors MG1 and MG2.

Both of the inverter circuits INV1 and INV2 are composed of six transistors T11–T16 and T21–T26 and six diodes D11–D16 and D21–D26. The six transistors T11–T16 and T21–T26 are arranged as three pairs of two between the positive pole bus 22 and the negative pole bus 24 so that one of the paired transistors is on the source side and the other of them is on the sink side, respectively, and each of the three-phase coils (u, v and w) of the motors MG1 and MG2 is connected with each of the connection points of the pairs. Accordingly, if the ratios of the periods of time when the paired transistors T11–T16 and T21–T26 are turned on are controlled so that voltages act on the positive pole bus 22 and the negative pole bus 24, the three-phase coils of the motors MG1 and MG2 form a rotating magnetic field that can drive the motors MG1 and MG2 to rotate. Because the switching control of the transistors T11–T16 of the inverter circuit INV1 and the switching control of the transistors T21–T26 of the inverter circuit INV2 can be performed independently, the driving control of the motors MG1 and MG2 can be performed independently.

The electronic control unit 40 is composed as a microprocessor centering on a CPU 42, and the electronic control unit 40 comprises a ROM 44 that stores a processing program, a RAM 46 that stores data temporarily and an input/output port (not shown). Into the electronic control unit 40, there are input, through the input port, the current of each phase from current sensors 51–53 and 61–63 attached to each phase of the three-phase coils (u, v and w) of the motors MG1 and MG2, the neutral point current from a current sensor 54 attached to the neutral point of the motor MG1, the rotation angles of the rotors of the motors MG1 and MG2 from rotation angle sensors 56 and 66 attached to the respective rotating shafts of the motors MG1 and MG2, the voltage Vc between terminals of the capacitor 32 from a voltage sensor 68 attached to the capacitor 32, command values concerning the actions of the motors MG1 and MG2, and the like. Moreover, from the electronic control unit 40, there are output, through the output port, control signals for performing the switching control of the transistors T11–T16 and T21–T26 of the inverter circuits INV1 and INV2, and the like.

Figure 7:
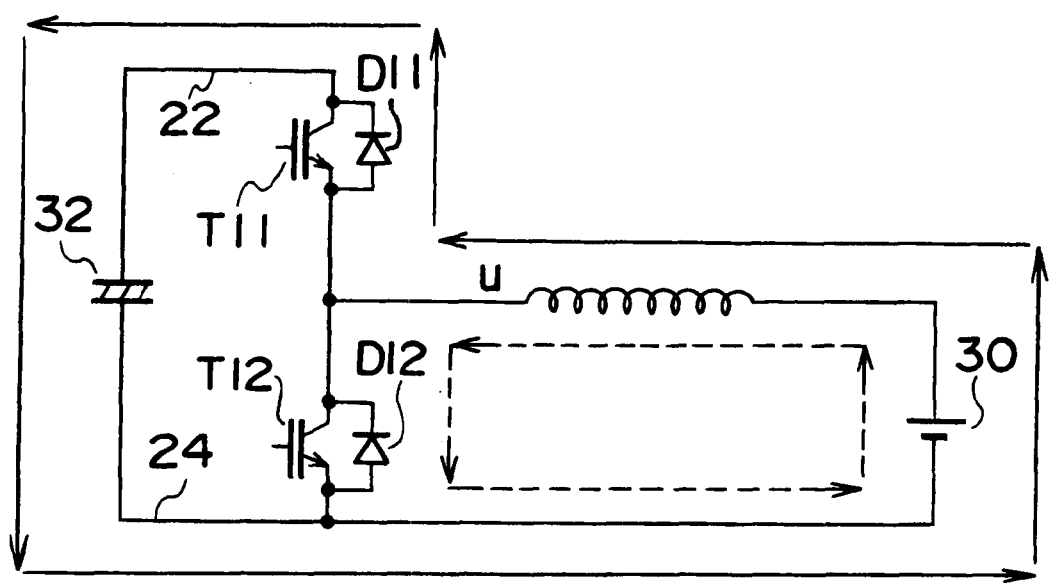
FIG. 7 is a circuit diagram of a part of the mechanical power outputting apparatus 20 of the embodiment 2 when the u-phase of the three-phase coils of a motor MG1 is noticed.

FIG. 7 is a circuit diagram of a part of the mechanical power outputting apparatus 20 of the embodiment 2 when the u-phase of the three-phase coils of the motor MG1 is noticed. Now, when a state in which the transistor T12 of the u-phase of the inverter circuit INV1 is turned on is considered, a short circuit shown by the broken arrows in the figure is formed, and the u-phase of the three-phase coils of the motor MG1 functions as a reactor. When the transistor T12 is turned off, the energy that is stored in the u-phase of the three-phase coils that functions as a reactor is stored in the capacitor 32 through the charging circuit shown by the solid arrows in the figure. The charged voltage in this case becomes higher than the supply voltage of the direct-current power supply 30. On the other hand, the direct-current power supply 30 can also be charged by means of the electrical potential of the capacitor 32 in the circuit. Consequently, the circuit can be regarded as a step-up and step-down chopper circuit that steps up the energy of the direct-current power supply 30 to store it in the capacitor 32 and can charge the direct-current power supply 30 by means of the electrical potential of the capacitor 32. Because the v-phase and the w-phase of the three-phase coils of the motor MG1 can also be regarded as a step-up and step-down chopper circuit like the u-phase thereof, the capacitor 32 can be charged by the execution of the turning on and off of the transistors T12, T14 and T16, and the direct-current power supply 30 can be charged by means of the electrical potential of the capacitor 32.

With such charging, a potential difference is generated between the terminals of the capacitor 32, and the potential difference can be controlled by the adjustment of the quantity of the charge stored in the capacitor 32, i.e. the current flowing through the reactor. Consequently, the voltage Vc between the terminals of the capacitor 32 can also be made twice as large as the supply voltage Vb of direct-current power supply 30. If the voltage Vc between the terminals of the capacitor 32 is thus made twice as large as the supply voltage Vb of the direct-current power supply 30, the mechanical power outputting apparatus 20 shown in the FIG. 6 is in a state where a voltage that is twice as large as the supply voltage Vb of the direct-current power supply 30 and is generated by the capacitor 32 acts on the positive pole bus 22 and the negative pole bus 24. Then, the motors MG1 and MG2 can be independently driven in conformity with the switching control of the transistors T11–T16 and T21–T26 of the inverter circuits INV1 and INV2.

Because a pseudo-three-phase alternating current can be supplied to the three-phase coils of the motor MG1 by the switching control of the transistors T11–T16 that compose the inverter circuit INV1 for the drive of the motor MG1, a direct-current component can also be added to the three-phase alternating current. That is, the electrical potential of the pseudo-three-phase alternating current is offset to the plus side or to the minus side. If the three-phase alternating current including the direct-current component is supplied to the motor MG1, the motor MG1 can be driven to rotate by the alternating-current component, and the capacitor 32 can be charged by the direct-current component as described by the use of the FIG. 7. That is, it is possible to charge the capacitor 32 at the same time to drive the motor MG1. The voltage Vc between the terminals of the capacitor 32 can be controlled by the adjustment of the largeness of the direct current component in this case.

Figure 8:
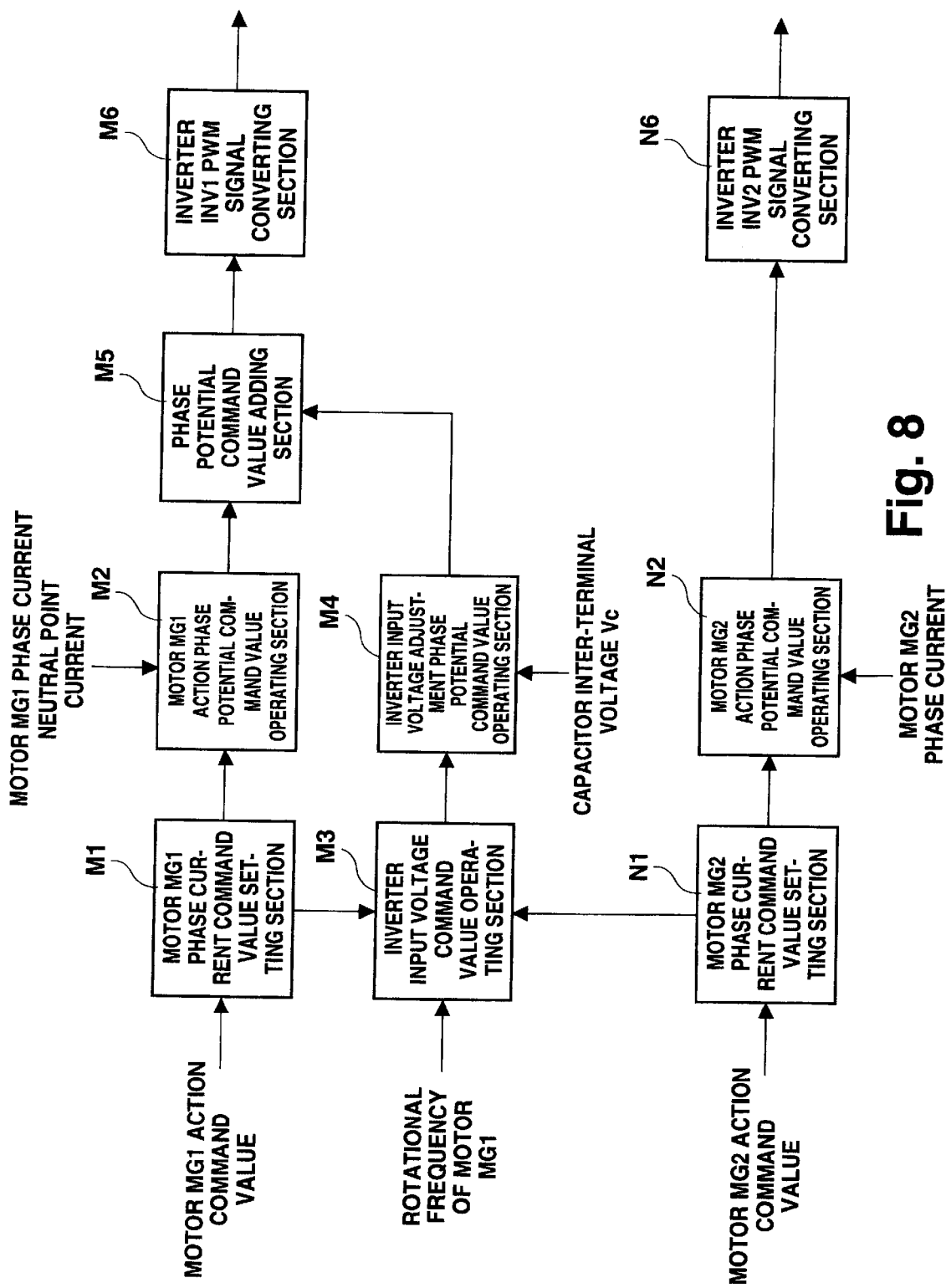
FIG. 8 is an explanatory view illustrating an example of an operation block when a control signal output to inverter circuits INV1 and INV2 by an electronic control unit 40 of the mechanical power outputting apparatus 20 of the embodiment 2 is operated.

Next, the operation of the mechanical power outputting apparatus 20 of the thus structured embodiment 2 will be described. FIG. 8 is an explanatory view for illustrating an example of the operation blocks when a control signal output to the inverter circuits INV1 and INV2 by the electronic control unit 40 of the mechanical power outputting apparatus 20 of the embodiment 2 is operated. As shown in the figure, the operation blocks are constituted of a motor MG1 phase current command value setting section M1 for setting a phase current command value of the motor MG1 on the basis of an input action command value of the motor MG1, a motor MG1 action phase potential command value operating section M2 for operating a phase potential command value for the action of the motor MG1 (the phase potential command value of the alternating-current component) on the basis of each phase current of the motor MG1 from the current sensors 51–53, a neutral point current from the current sensor 54, and a motor phase current command value, a motor MG2 phase current command value setting section N1 for setting a phase current command value of the motor MG2 on the basis of an input action command value of the motor MG2, a motor MG2 action phase potential command value operating section N2 for operating a phase potential command value for the action of the motor MG2 on the basis of each phase current of the motor MG2 from the current sensors 61–63 and the phase current command value of the motor MG2, an inverter INV2 PWM signal converting section N6 for converting the phase potential command value for the action of the motor MG2 into a PWM signal to output it to the inverter circuit INV2, an inverter input voltage command value operating section M3 for operating an inverter input voltage command value as a voltage command value between the positive pole bus 22 and the negative pole bus 24 on the basis of the rotational frequency of the rotor of the motor MG1 obtained on the basis of the rotation angle from the rotation angle sensor 56 and phase current command values to the motors MG1 and MG2, an inverter input voltage adjustment phase potential command value operating section M4 for setting a phase potential command value for adjusting an inverter input voltage (the phase potential command value of the direct-current component) on the basis of the voltage Vc between the terminals of the capacitor 32 from the voltage sensor 68 and the inverter input voltage command value, a phase potential command value adding section M5 for adding the phase potential command value for the action of the motor MG1 as the alternating-current component and the phase potential command value for adjusting the inverter input voltage as the direct-current component, and an inverter INV1 PWM signal converting section M6 for converting the phase potential command value obtained by the addition of the alternating-current component and the direct-current component into a PWM signal to output it to the inverter circuit INV1. The control of the voltage Vc between the terminals of the capacitor 32 and the independent drive control of the motors MG1 and MG2 can be performed by such operation blocks.

Figure 9:
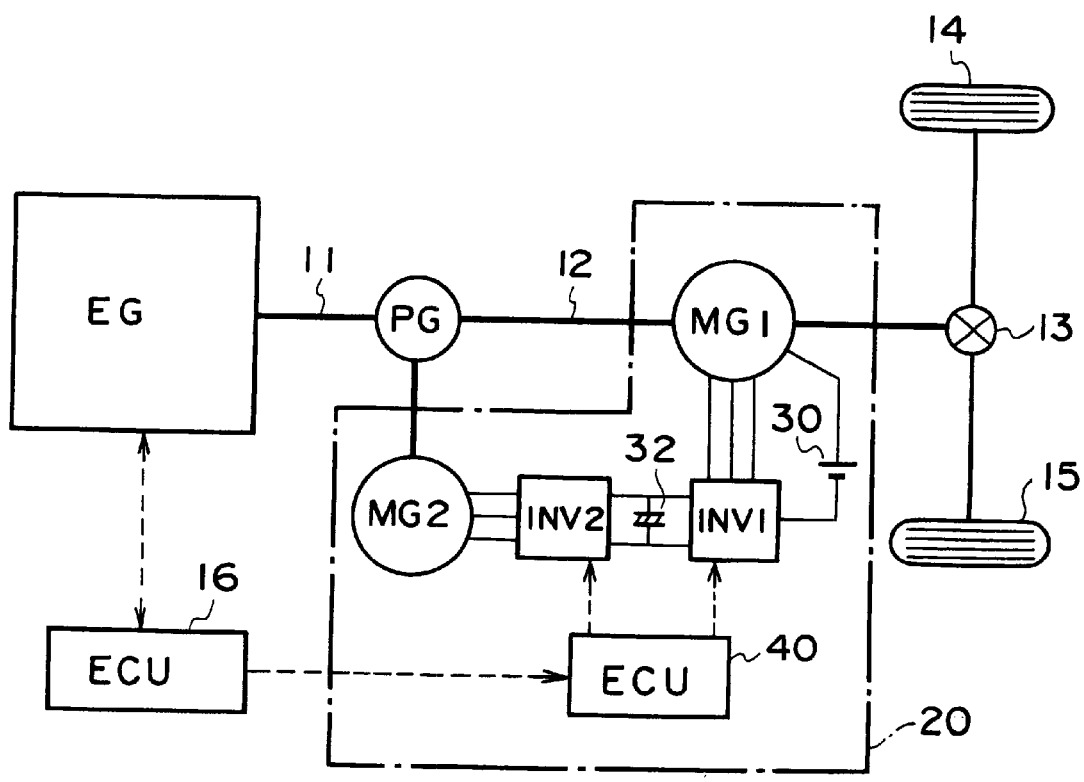
FIG. 9 is a schematic diagram showing an outline of the configuration when the mechanical power outputting apparatus 20 of the embodiment 2 is applied as the mechanical power outputting apparatus of a vehicle.

FIG. 9 is a schematic diagram showing the outline of the configuration when the mechanical power outputting apparatus 20 of the embodiment 2 is applied as a part of the mechanical power outputting apparatus 10 of a vehicle. The mechanical power outputting apparatus 10 for a vehicle comprises an engine EG as an internal combustion engine, a planetary gear PG connected with the crank shaft 11 of the engine EG in a state of carrier connection, the mechanical power outputting apparatus 20 of the embodiment 2 that connects the motor MG2 with the rotating shaft connected with the sun gear of the planetary gear PG and connects the motor MG1 with the driving shaft 12 connected with the ring gear of the planetary gear PG, and an electronic control unit 16 for controlling the whole of the mechanical power outputting apparatus 10 for a vehicle. The drive shaft 12 is connected with drive wheels 14 and 15 through a differential gear 13, and the mechanical power output to the driving shaft 12 is finally output to the driving wheels 14 and 15. Although the mechanical power outputting apparatus 20 of the embodiment 2 can directly output mechanical power to the driving shaft 12 by the motor MG2 by means of the electric power from the direct-current power supply 30, the mechanical power outputting apparatus 20 can output the mechanical power to the driving shaft 12 by performing the torque conversion of the mechanical power output from the engine EG with the planetary gear PG. That is, the engine EG is driven at a driving point having a good efficiency, and the rotational frequency and the torque of the engine EG are converted into the rotational frequency and the torque of the driving shaft 12, respectively, to output the converted rotational frequency and the torque to the driving shaft 12. Consequently, the motors MG1 and MG2 perform their driving as a dynamo-electric motor or as an electric generator as occasion demands. On this occasion, the capacitor 32 is charged by a motor that also functions as the electric generator, and the voltage Vc between the terminals thereof can be controlled by the exchange of energy between the capacitor 32 and the direct-current power supply 30. In addition to the operation of the torque conversion, the direct-current power supply 30 can be charged by the use of a part of the mechanical power from the engine EG, and mechanical power can be added to the driving shaft 12 by the use of electric power from the direct-current power supply 30 together with the torque conversion of the mechanical power from the engine EG. Moreover, when braking force is made to operate on the driving wheels 14 and 15, it is also possible to charge the direct-current power supply 30 by the electric power obtained by the regenerative control of the motor MG1.

According to the mechanical power outputting apparatus 20 of the embodiment 2 described above, the voltage Vc between the terminals of the capacitor 32 can be controlled and the driving control of the motor MG1 can be performed by the switching control of the transistors T11–T16 of the inverter circuit INV1. Moreover, the driving control of the motor MG2 can be performed independently of the motor MG1 by the switching control of the transistors T21–T26 of the inverter circuit INV2. Besides, because the voltage between the terminals of the capacitor 32 connected between the positive pole bus 22 and the negative pole bus 24 of the inverter circuits INV1 and INV2 is stepped up to be charged by means of the energy of the direct-current power supply 30, the supply voltage Vb of the direct-current power supply 30 can be made lower than a voltage necessary to drive the motor 22. Because the voltage Vc between the terminals of the capacitor 32 can be controlled, the voltage Vc can be set to a more suitable value according to the driving of the motors MG1 and MG2. As a result, the energy efficiency of the apparatus can be improved.

Figure 10:
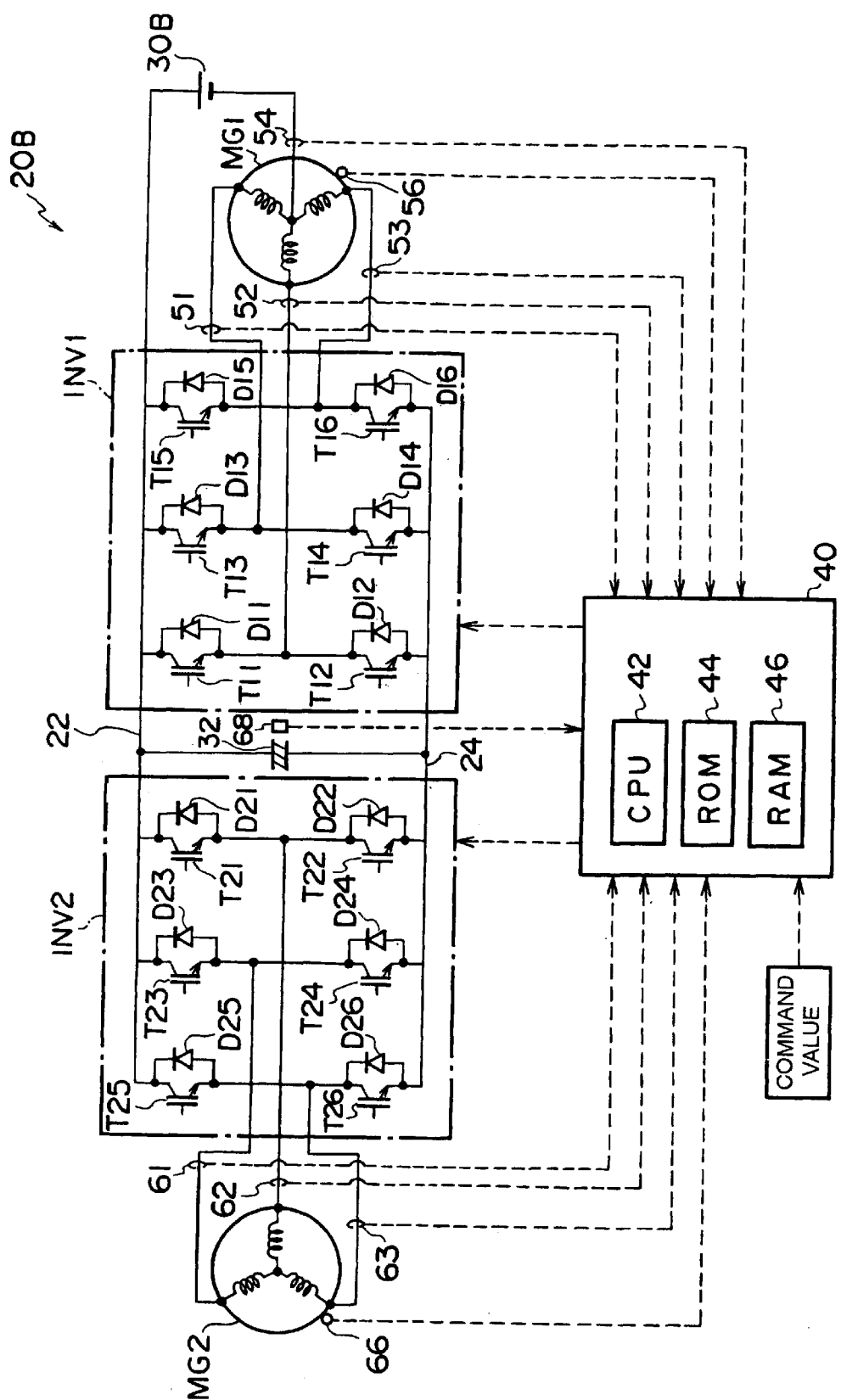
FIG. 10 is a schematic diagram showing an outline of the configuration of a modified mechanical power outputting apparatus 20B.

Although, in the mechanical power outputting apparatus 20 of the embodiment 2, the direct-current power supply 30 is connected between the negative pole bus 24 of the inverter circuits INV1 and INV2 and the neutral point of the motor MG1, a direct-current power supply 30B may be connected between the positive pole bus 22 of the inverter circuits INV1 and INV2 and the neutral point of the motor MG1 like the modified mechanical power outputting apparatus 20B shown in FIG. 10. The modified mechanical power outputting apparatus 20B can also control the voltage Vc between the terminals of the capacitor 32 and can perform the driving control of the motor MG1 by the switching control of the transistors T11–T16.

Figure 11:
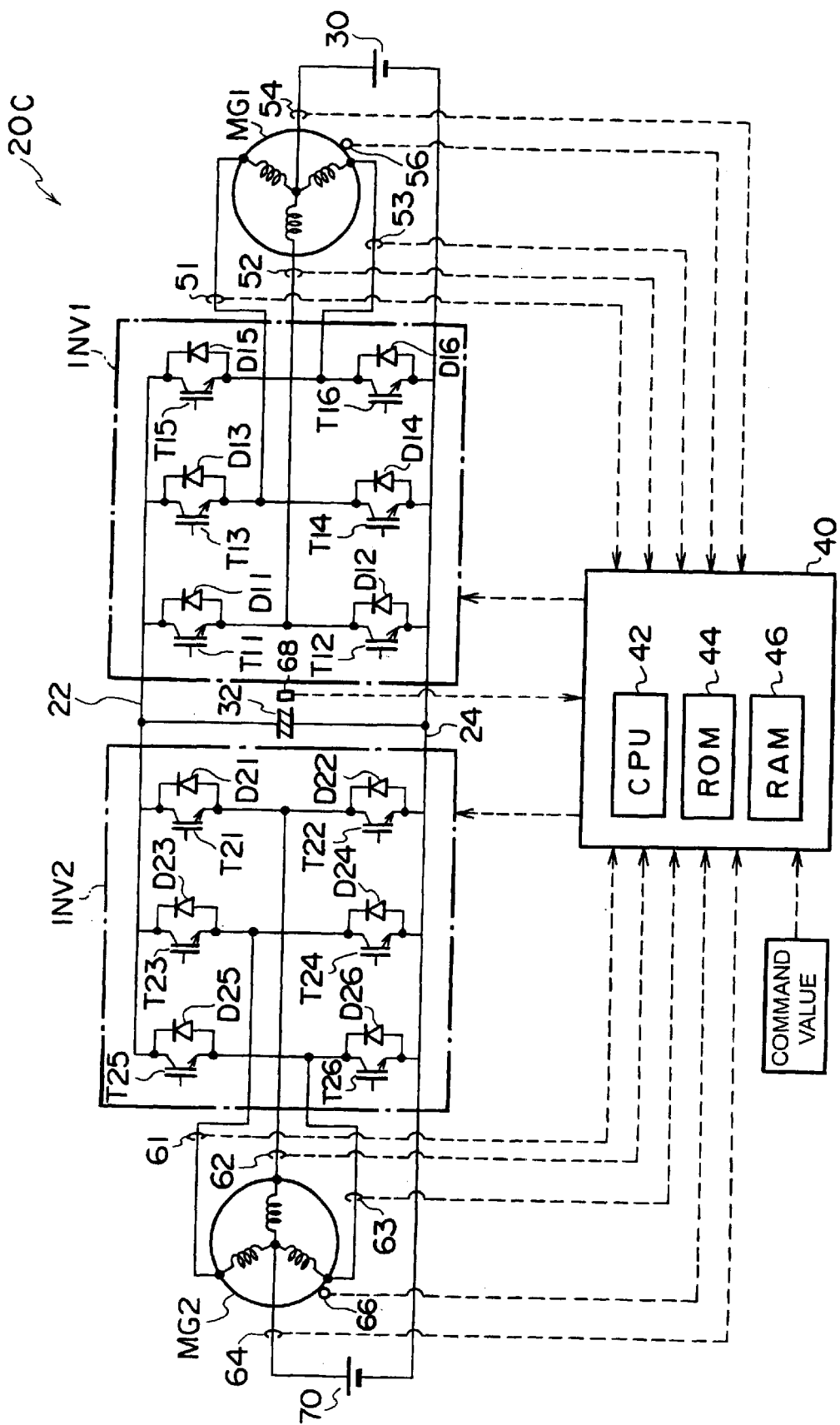
FIG. 11 is a schematic diagram showing an outline of the configuration of another modified mechanical power outputting apparatus 20C.

Although, in the mechanical power outputting apparatus 20 of the embodiment 2, the direct-current power supply 30 is connected between the negative pole bus 24 of the inverter circuits INV1 and INV2 and the neutral point of the motor MG1, a direct-current power supply 70 may be connected between the negative pole bus 24 of the inverter circuits INV1 and INV2 and the neutral point of the motor MG2 in addition to the configuration of the mechanical power outputting apparatus 20 of the embodiment 2 like the modified mechanical power outputting apparatus 20C shown in FIG. 11. The voltage Vc between the terminals of the capacitor 32 can be controlled and the driving control of the motor MG2 can be performed by the switching control of the transistors T21–T26 of the inverter circuits INV2 in the modified mechanical power outputting apparatus 20C. That is, the modified mechanical power outputting apparatus 20C can charge the capacitor 32 by means of both of the switching control of the transistors T11–T16 of the inverter circuit INV1 and the switching control of the transistors T21–T26 of the inverter circuit INV2. Incidentally, as described concerning the modified mechanical power outputting apparatus 20B shown in FIG. 10, because the direct-current power supply 30 may be attached so as to connect the positive pole bus 22 with the neutral point of the motor MG1, either or both of the direct-current power supply 30 and the direct-current power supply 70 may be attached so as to connect the positive pole bus 22 with the neutral point of a corresponding motor.

EMBODIMENT 3

Figure 12:
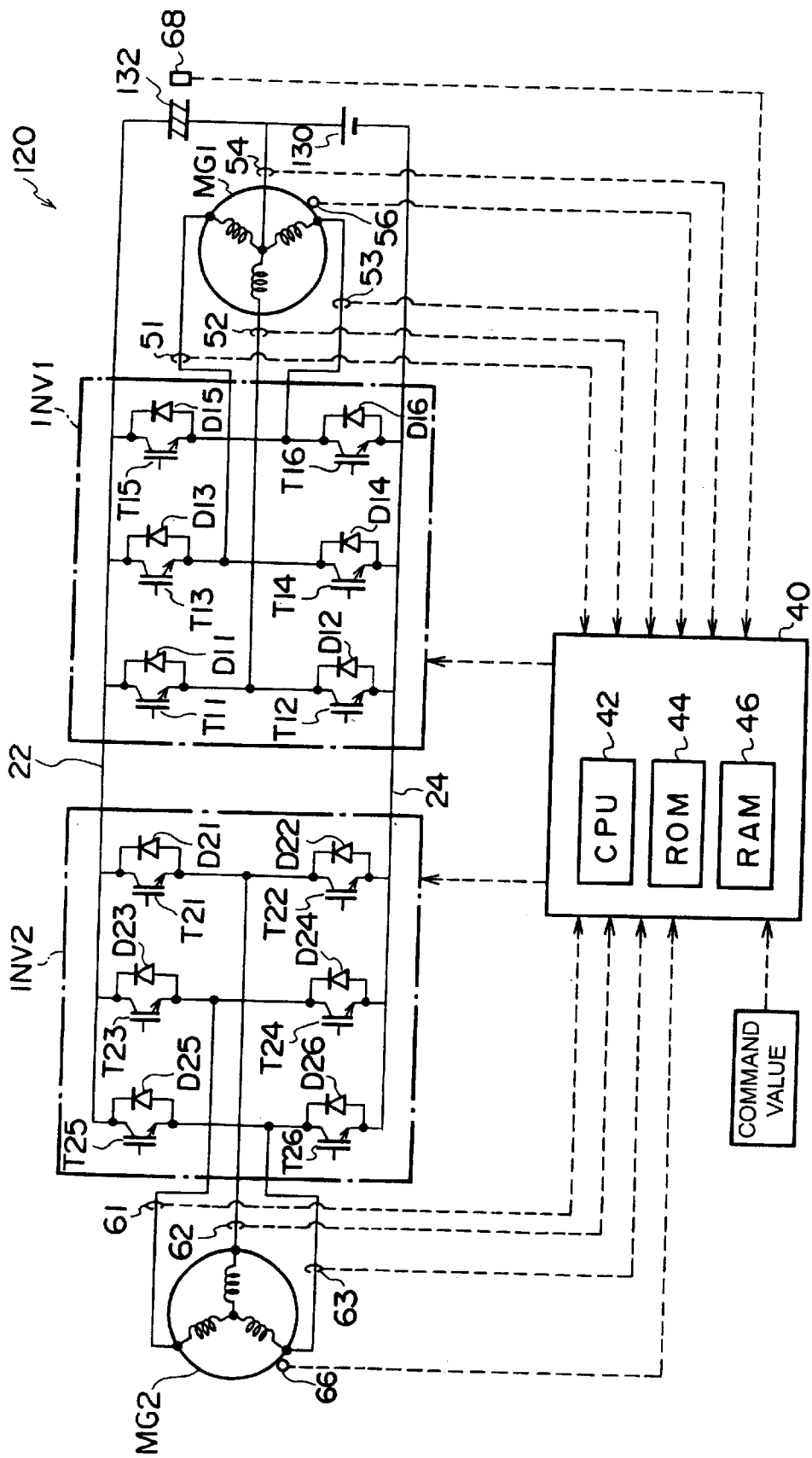
FIG. 12 is a schematic diagram showing an outline of the configuration of a mechanical power outputting apparatus 120 of a third embodiment (embodiment 3)

Next, the mechanical power outputting apparatus 120 as the embodiment 3 of the present invention will be described. FIG. 12 is the schematic diagram showing the outline of the configuration of the mechanical power outputting apparatus 120 of the embodiment 3. The mechanical power outputting apparatus 120 of the embodiment 3 has the same configuration as that of the mechanical power outputting apparatus of the embodiment 2 other than the disposition of a capacitor 132 as shown in the figure. Accordingly the same constitutional elements of the mechanical power outputting apparatus 120 of the embodiment 3 as those of the mechanical power outputting apparatus 20 of the embodiment 2 are designated by the same reference characters as those of the embodiment 2, and their descriptions are omitted. In the mechanical power outputting apparatus 120 of the embodiment 3, the capacitor 132 is attached so as to connect the positive pole bus 22 of the inverter circuits INV1 and INV2 with the neutral point of the motor MG1.

Figure 13:
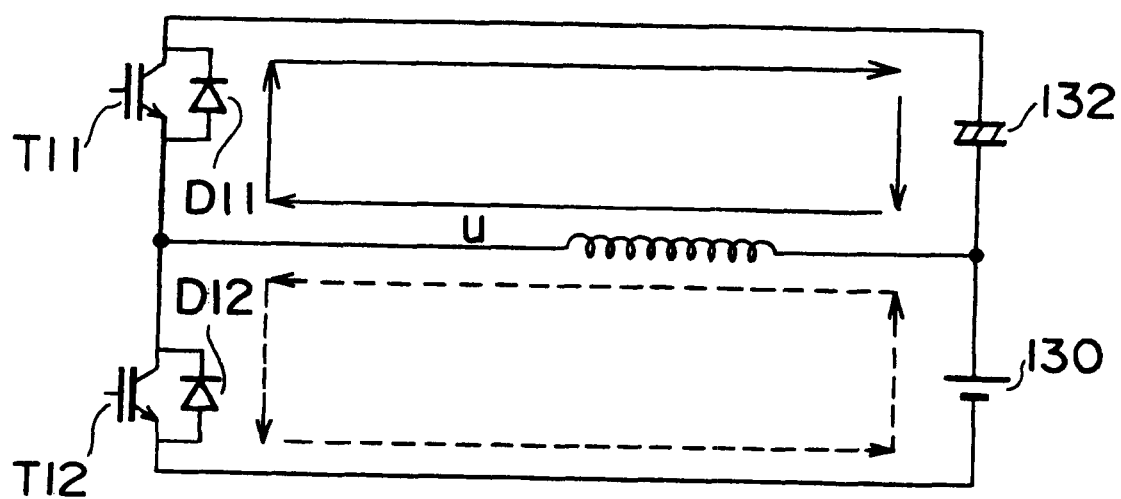
FIG. 13 is a circuit diagram of a part of the mechanical power outputting apparatus 120 of the embodiment 3 when the u-phase of the three-phase coils of the motor MG1 is noticed.

FIG. 13 is a circuit diagram of a part of the mechanical power outputting apparatus 120 of the embodiment 3 when the u-phase of the three-phase coils of the motor MG1 is noticed. Now, when a state in which the transistor T12 of the u-phase of the inverter circuit INV1 is turned on is considered, a short circuit shown by the broken arrows in the figure is formed, and the u-phase of the three-phase coils of the motor MG1 functions as a reactor. When the transistor T12 is turned off, the energy that is stored in the u-phase of the three-phase coils that functions as a reactor is stored in the capacitor 132 through the charging circuit shown by the solid arrows in the figure. On the other hand, the direct-current power supply 130 can also be charged by means of the electrical potential of the capacitor 132 similarly by the turning off of the transistor T11 The circuit can be regarded as a chopper circuit that stores the energy of the direct-current power supply 130 in the capacitor 132 and can charge the direct-current power supply 130 by means of the electrical potential of the capacitor 132. Because the v-phase and the w-phase of the three-phase coils of the motor MG1 can also be regarded as a chopper circuit like the u-phase, the capacitor 132 can be charged by turning on and off of the transistors T11–T16, and the direct-current power supply 130 can be charged by means of the electrical potential of the capacitor 132.

With such charging, a potential difference is generated between the terminals of the capacitor 132, and the potential difference can be controlled by adjustment of the quantity of the charge stored in the capacitor 132, i.e. the current flowing through the reactor. Consequently, the voltage Vc between the terminals of the capacitor 132 can also be made to be equal to the supply voltage Vb of the direct-current power supply 130. If the voltage Vc between the terminals of the capacitor 132 is thus made to be equal to the supply voltage Vb of the direct-current power supply 130, the mechanical power outputting apparatus 120 shown in the FIG. 12 is in a state where a direct current power supply that is composed of a direct-current power supply 130 and the capacitor 132, and supplies a voltage being twice as large as the supply voltage Vb of the direct-current power supply 130, is connected between the positive pole bus 22 and the negative pole bus 24. Then, the motors MG1 and MG2 can be independently driven in conformity with the switching control of the transistors T11–T16 and T21–T26 of the inverter circuits INV1 and INV2.

Because, for the driving control of the motor MG1 and the charging control of the capacitor 132 in the mechanical power outputting apparatus 120 of the embodiment 3, similarly to the mechanical power outputting apparatus 20 of the embodiment 2, a pseudo-three-phase alternating current generated by the switching control of the transistors T11–T16 constituting the inverter circuit INV1 should include a direct-current component, the electrical potential of the pseudo-three-phase alternating current should be offset to the plus side or to the minus side. Consequently, the mechanical power outputting apparatus 120 of the embodiment 3 can also perform the switching control of the transistors T11–T16 and T21–T26 of the inverter circuits INV1 and INV2 by means of the operation blocks shown in FIG. 8.

According to the mechanical power outputting apparatus 120 of the embodiment 3 described above, the same advantages as those of the mechanical power outputting apparatus 20 of the embodiment 2 can be obtained, namely the advantage that the control of the voltage Vc between the terminals of the capacitor 132 and the driving control of the motor MG1 can be performed simultaneously by the switching control of the inverter circuit INV1, an advantage that the driving control of the motor MG2 can be performed independently of the motor MG1 by the switching control of the inverter circuit INV2, and the like can be obtained. Moreover, because the mechanical power outputting apparatus 120 of the embodiment 3 makes the positive pole bus 22 and the negative pole bus 24 be in a state of being connected with a direct-current power supply composed of the capacitor 132 and the direct-current power supply 130, the withstand voltage of the capacitor 132 can be made smaller than the withstand voltage of the capacitor 32 of the embodiment 2. As a result, the mechanical power outputting apparatus 120 of the embodiment 3 can be smaller in size and cheaper in cost, and can improve its durability and stability. Incidentally, the mechanical power outputting apparatus 120 of the embodiment 3 can also be applied to a part of the mechanical power outputting apparatus for a vehicle shown in FIG. 9 similarly to the mechanical power outputting apparatus 20 of the embodiment 2.

Figure 14:
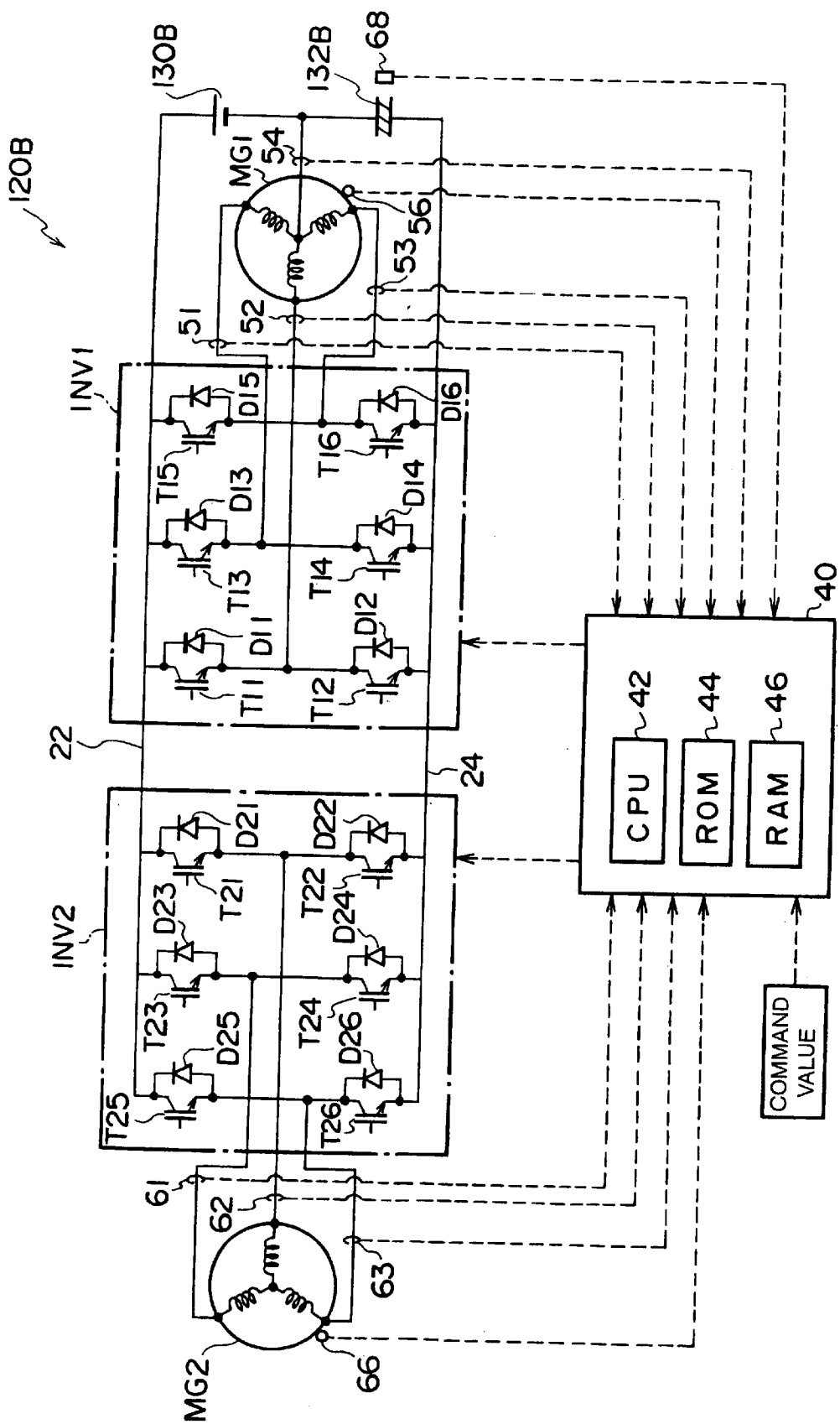
FIG. 14 is a schematic diagram showing an outline of the configuration of a modified mechanical power outputting apparatus 120B.

Although, in the mechanical power outputting apparatus 120 of the embodiment 3, the positive pole bus 22 and the neutral point of the motor MG1 are connected with the capacitor 132 and the negative pole bus 24 and the neutral point of the motor MG1 are connected with the direct-current power supply 130, a modified mechanical power outputting apparatus 120B shown in FIG. 14 may be structured so as to connect the positive pole bus 22 and the neutral point of the motor MG1 with a direct-current power supply 130B and connect the negative pole bus 24 and the neutral point of the motor MG1 with a capacitor 132B. The modified mechanical power outputting apparatus 120B can also control the voltage Vc between the terminals of a capacitor 132B and can perform the driving control of the motor MG1 by the switching control of the transistors T11–T16.

Figure 15:
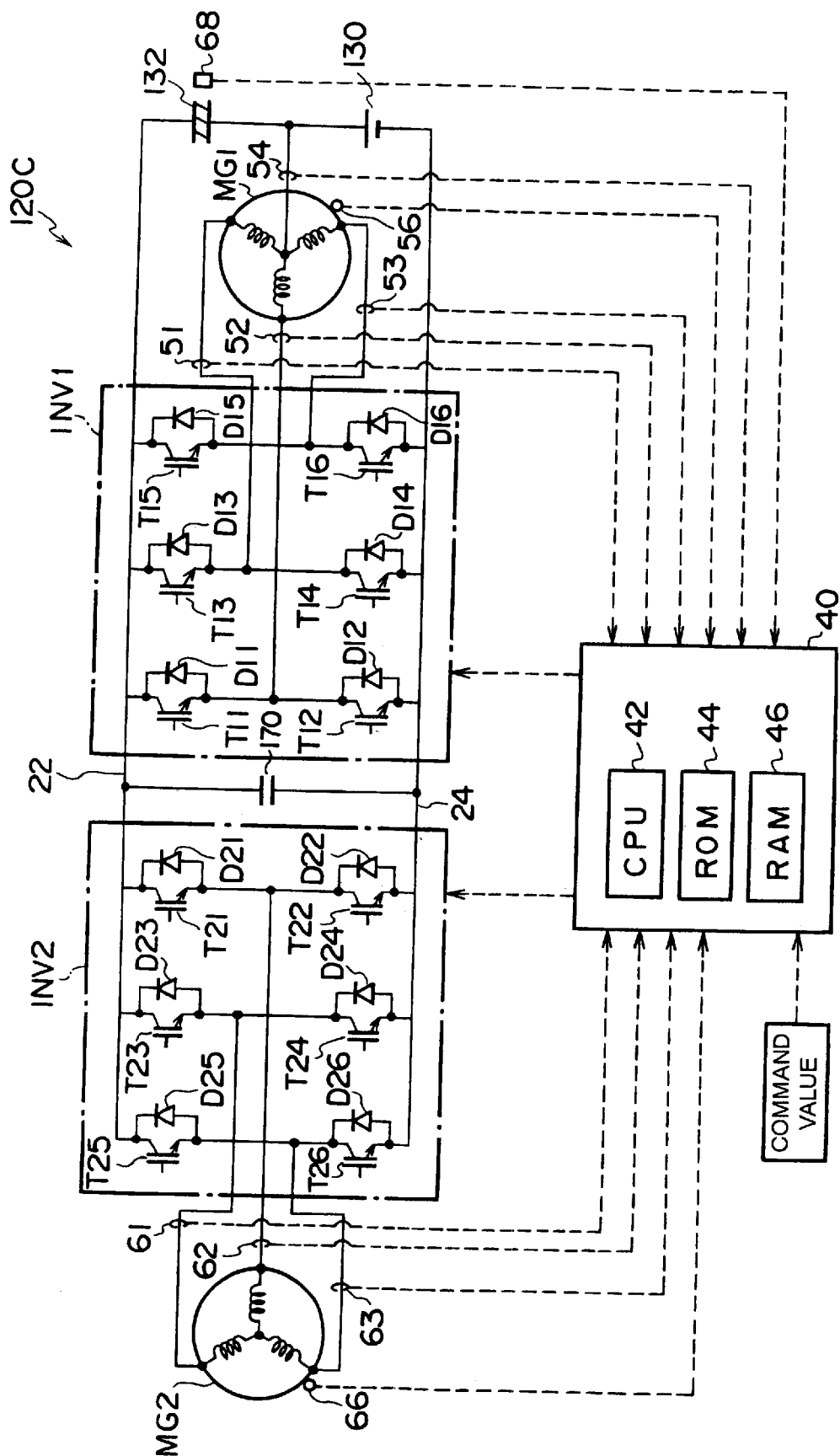
FIG. 15 is a schematic diagram showing an outline of the configuration of another modified mechanical power outputting apparatus 120C.

Although, in the mechanical power outputting apparatus 120 of the embodiment 3, the positive pole bus 22 and the negative pole bus 24 of the inverter circuits INV1 and INV2 are connected with the capacitor 132 and the direct-current power supply 130 in series, a capacitor 170 connecting the positive pole bus 26 and the negative pole bus 28 may be provided like the modified mechanical power outputting apparatus 120C shown in FIG. 15. With such a structure, the surge absorption of the transistors T11–T16 of the inverter circuit INV1 and the transistors T21–T26 of the inverter circuit INV2 can be performed rapidly. Incidentally, if the capacitor 170 is used as the surge absorption of the transistors T11–T16 and T21–T26, the capacitance thereof may be very small. However, if the capacitor 170 is used for storing energy like the capacitor 132, the capacitance thereof becomes large.

Figure 16:
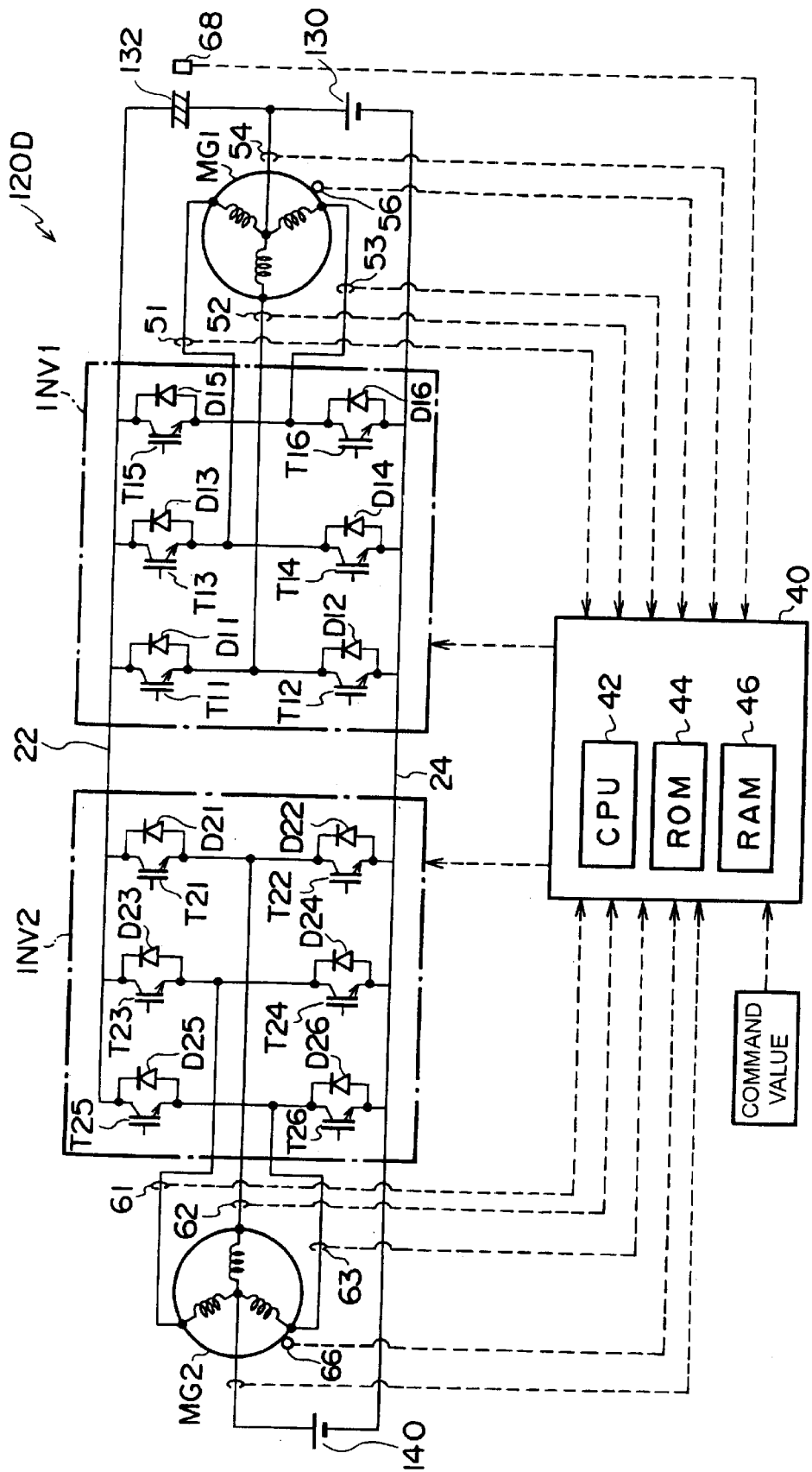
FIG. 16 is a schematic diagram showing an outline of the configuration of a still another modified mechanical power outputting apparatus 120D.
Figure 17:
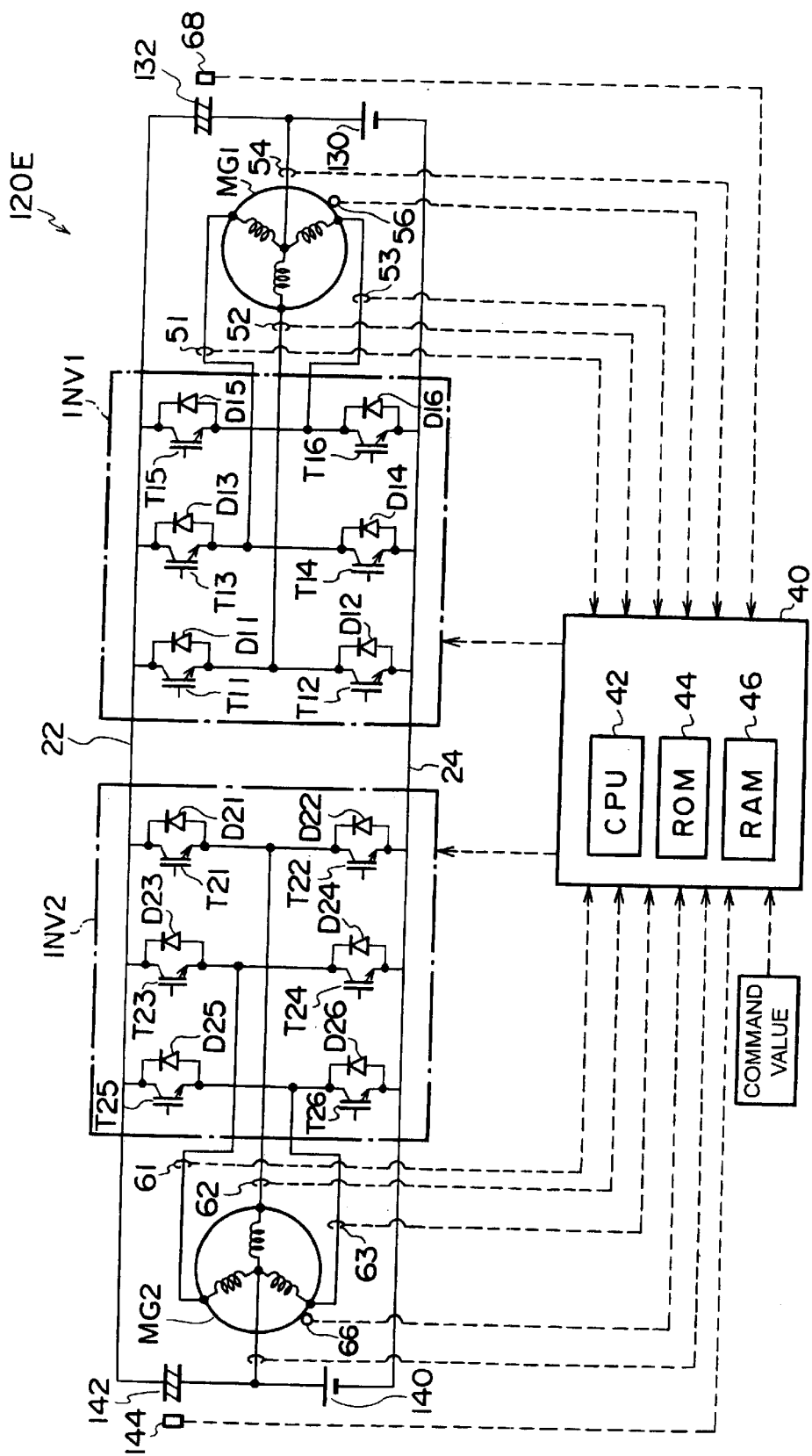
FIG. 17 is a schematic diagram showing an outline of the configuration of a yet another modified mechanical power outputting apparatus 120E.

Although, in the mechanical power outputting apparatus 120 of the embodiment 3, the direct-current power supply 130 is connected between the negative pole bus 24 of the inverter circuits INV1 and INV2 and the neutral point of the motor MG1 and the capacitor 132 is connected between the positive pole bus 22 and the neutral point of the motor MG1, a direct-current power supply 140 may be connected between the negative pole bus 24 of the inverter circuits INV1 and INV2 and the neutral point of the motor MG2 in addition to the configuration of the mechanical power outputting apparatus 120 of the embodiment 3, like the modified mechanical power outputting apparatus 120D shown in FIG. 16. The modified mechanical power outputting apparatus 120D can control the voltage Vc between the terminals of the capacitor 132 and can perform the driving control of the motor MG2 by the switching control of the transistors T21–T26 of the inverter circuit INV2. That is, the modified mechanical power outputting apparatus 120D can charge the capacitor 132 by both of the switching control of the transistors T11–T16 of the inverter circuit INV1 and the switching control of the transistors T21–T26 of the inverter circuit INV2. Incidentally, because the direct-current power supply 130 may be attached so as to connect the positive pole bus 22 with the neutral point of the motor MG1 as described in regard to the modified mechanical power outputting apparatus 120B shown in FIG. 14, the direct-current power supply 140 may be connected between the negative pole bus 24 and the neutral point of the motor MG2 in addition to the configuration of the modified mechanical power outputting apparatus 120B of FIG. 14. Moreover, the direct-current power supply 140 may be connected between the positive pole bus 22 and the neutral point of the motor MG2 in addition to the configuration of the mechanical power outputting apparatus 120 of the embodiment 3 or the configuration of the modified mechanical power outputting apparatus 120C of FIG. 15. Furthermore, as the modified mechanical power outputting apparatus shown in FIG. 17, a capacitor 142 may be connected between the positive pole bus 22 and the neutral point of the motor MG2.

Although the mechanical power outputting apparatus 20 of the embodiment 2, the mechanical power outputting apparatus 120 of the embodiment 3 and their variations, all of which are described above, can be applied to a part of the mechanical power outputting apparatus 10 for a vehicle, they can be applied to a mechanical power outputting apparatus of a movable body such as a vessel and an airplane beside the vehicle or a fixed type apparatus or a part of the mechanical power outputting apparatus.

EMBODIMENT 4

Figure 18:
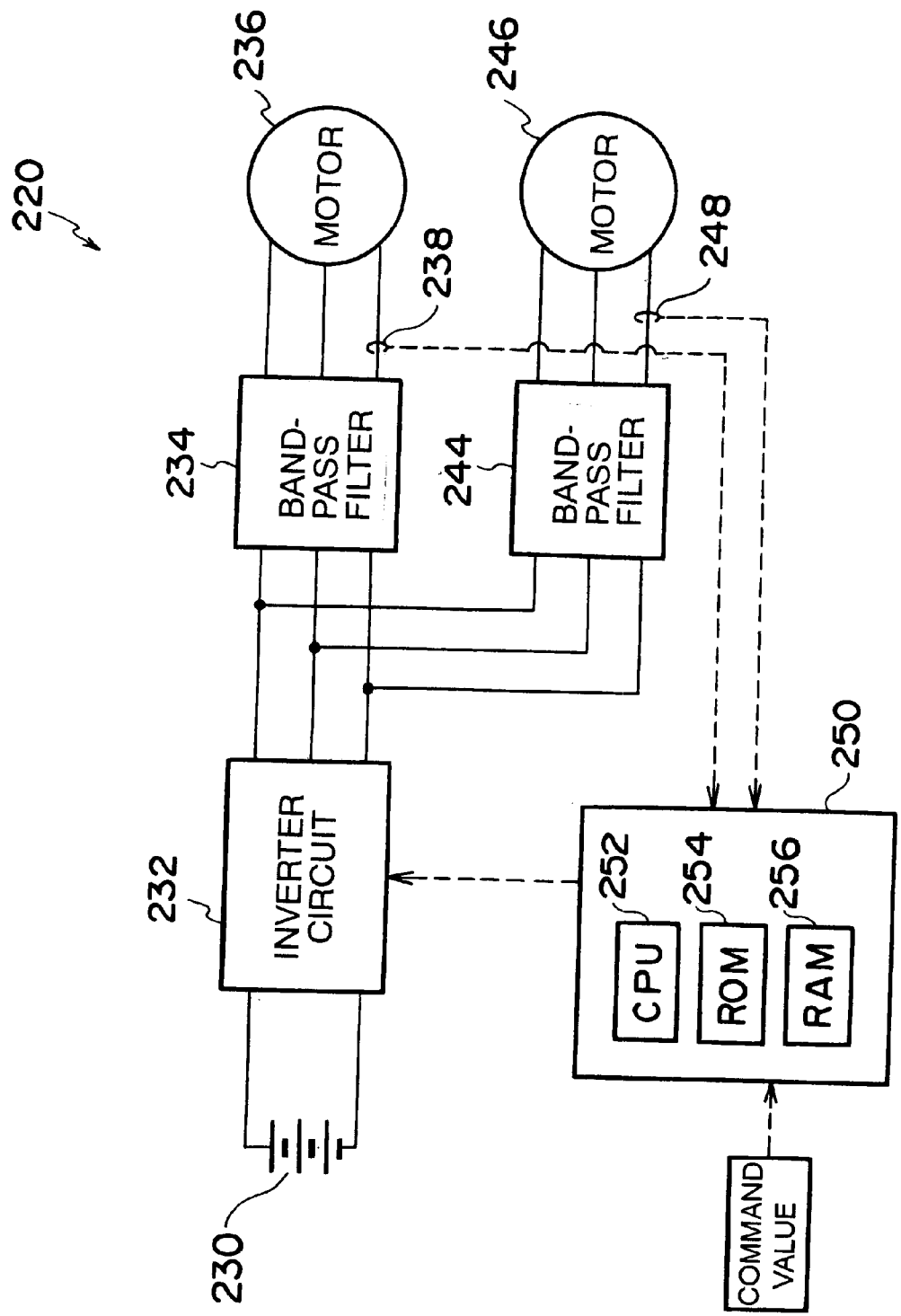
FIG. 18 is a schematic diagram showing an outline of the configuration of a mechanical power outputting apparatus 220 of a fourth embodiment (embodiment 4)

Next, the mechanical power outputting apparatus 220 as the embodiment 4 of the present invention will be described. FIG. 18 is the schematic diagram showing the outline of the configuration of the mechanical power outputting apparatus 220 of the embodiment 4. The mechanical power outputting apparatus 220 of the embodiment 4 comprises an inverter circuit 232 for converting a direct-current power from a direct-current power supply 230 into a mixed three-phase alternating-current power formed by the mixing of a three-phase alternating current carried by a first carrier frequency and a three-phase alternating current carried by a second carrier frequency different from the first carrier frequency by the switching operation of six transistors, a bandpass filter 234 for extracting a first carrier frequency component from the mixed three-phase alternating-current power to supply the extracted first carrier frequency component to a motor 236, a bandpass filter 244 for extracting a second carrier frequency component from the mixed three-phase alternating-current power to supply the extracted second carrier frequency component to a motor 246, and an electronic control unit 250 for controlling the whole apparatus as shown in the figure.

The motors 236 and 246 are structured as a synchronous generation dynamo-electric motor, similarly to the motors MG1 and MG2 of the embodiment 2. The inverter circuit 232 switches the six transistors on the basis of the control signals from the electronic control unit 250 so as to output the mixed three-phase alternating current formed by the mixing of the three-phase alternating current carried by the first carrier frequency at the time of the driving of the motor 236 and the three-phase alternating current carried by the second carrier frequency at the time of the driving of the motor 246.

The electronic control unit 250 is composed as a microprocessor centering on a CPU 252, and the electronic control unit 250 comprises a ROM 254 that stores a processing program, a RAM 256 that stores data temporarily and an input/output port (not shown). Motor currents from current sensors 238 and 248 attached to the three-phase coils of the motors 236 and 246, and the like are input into the electronic control unit 250 through the input port thereof. Moreover, the control signals to the inverter circuit 232, and the like are output from the electronic control unit 250 through the output port thereof. The electronic control unit 250 carries out the operation of the switching for forming the mixed three-phase alternating current that is a mixture of the three-phase alternating current to be carried by the first carrier frequency and to be imposed on the motor 236 and the three-phase alternating current to be carried by the second carrier frequency and to be imposed on the motor 246 on the basis of the command values for the action of the motors 236 and 246 and motor currents, and the electronic control unit 250 outputs the operation results to the inverter circuit 232 as control signals. The inverter circuit 232 receives the control signals to perform the switching of the six transistors.

According to the mechanical power outputting apparatus 220 of the embodiment 4 described above, the driving control of the motors 236 and 246 can be performed by one inverter circuit. Consequently, the downsizing and the reduction in costs of the apparatus can be achieved.

EMBODIMENT 5

Figure 19:
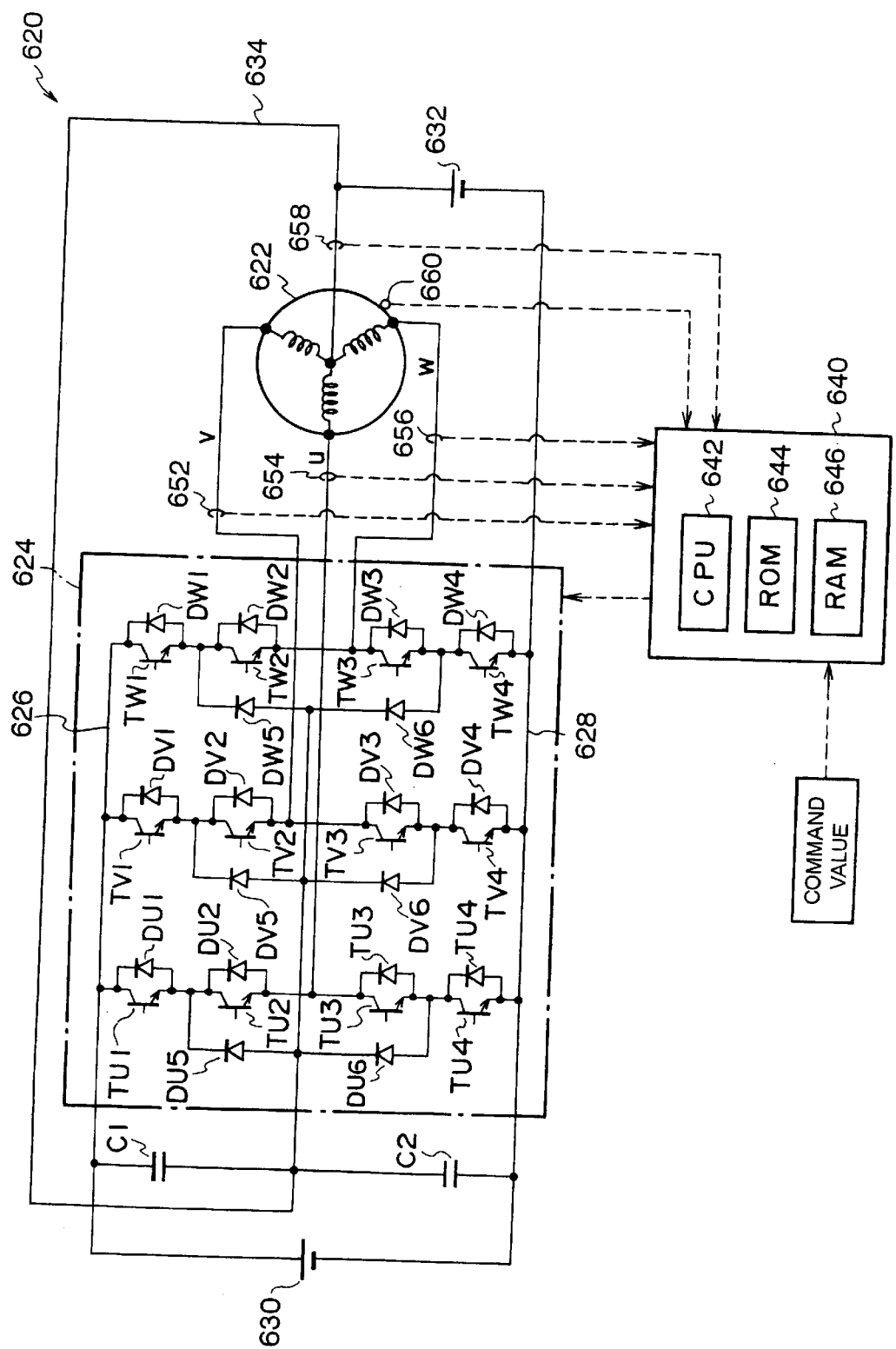
FIG. 19 is a schematic diagram showing an outline of the configuration of a mechanical power outputting apparatus 620 of a fifth embodiment (embodiment 5) of the present invention.

FIG. 19 is the schematic diagram showing the outline of the configuration of the mechanical power outputting apparatus 620 of the embodiment 5 of the present invention. The mechanical power outputting apparatus 620 of the embodiment 5 comprises a motor 622 driven to rotate by a three-phase alternating current, an inverter circuit 624 capable of converting a direct-current power into a three-phase alternating-current power to supply the converted three-phase alternating-current power to the motor 622, a first direct-current power supply 630 connected between the positive pole bus 626 and the negative pole bus 628 of the inverter circuit 624, a second direct-current power supply 632 connected between the negative pole bus 628 of the inverter circuit 624 and the neutral point of the motor 622, and an electronic control unit 640 for controlling the whole apparatus as shown in the figure.

The motor 622 is structured as a synchronous generation dynamo-electric motor that is capable of the generation of electrical energy and is constituted of, for example, a rotor having a permanent magnet affixed on the outer surface and a stator on which three-phase coils are wound. The rotating shaft of the motor 622 is the outputting shaft of the mechanical power outputting apparatus 620 of the embodiment 5, and mechanical power is output from the rotating shaft. Incidentally, because the motor 622 is structured as a generation dynamo-electric motor, the generation of electrical energy can be performed with the motor 622 by the input of mechanical power into the rotating shaft of the motor 622.

The inverter circuit 624 is configured with twelve transistors TU1–TU4, TV1–TV4 and TW1–TW4 and eighteen diodes DU1–DU6, DV1–DV6 and DW1–DW6. The u-phase of the inverter circuit 624 connects the positive pole bus 626 and the negative pole bus 628 in series with four transistors TU1–TU4, and the u-phase of the three phase coils of the motor 622 is connected with the connection point of the transistor TU2 and the transistor TU3. The connection point of the transistor TU1 and the transistor TU2 and the connection point of the transistor TU3 and the transistor TU4 are connected in series with two diodes DU5 and DU6 the forward direction of which is a direction oriented to the positive pole bus 626 side from the negative pole bus 628 side. The connection point of the diode DU5 and the diode DU6 is connected with the neutral point of the motor 622. Incidentally, diodes DU1–DU4 for circulation are attached to the respective transistors TU1–TU4, respectively. The v-phase and the w-phase of the inverter circuit 624 are configured similarly to the u-phase thereof.

The positive pole bus 626 and the negative pole bus 628 of the inverter circuit 624 are connected in series with two capacitors C1 and C2. The connection point of the capacitor C1 and the capacitor C2 is connected with the neutral point of the motor 622 with a connection line 634.

The first direct-current power supply 630 and the second direct-current power supply 632 are structured as a secondary battery, for example, in a nickel hydrogen series or in a lithium ion series. The voltage V1 between the terminals of the first direct-current power supply 630 and the voltage V2 between the terminals of the second direct-current power supply 632 are adjusted so that the voltage V1 is twice as large as the voltage V2. Consequently, when the neutral point of the motor 622 is taken as a reference, the electrical potential of the positive pole bus 626 is V1–V2, and the electrical potential of the negative pole bus 628 is –V2. Hereinafter, the voltage of the positive pole bus 626 is supposed to be ½ VB and the voltage of the negative pole bus 628 is supposed to be –½ VB for the following consideration.

The electronic control unit 640 is composed as a microprocessor centering on a CPU 642, and the electronic control unit 640 comprises a ROM 644 that stores a processing program, a RAM 646 that stores data temporarily and an input/output port (not shown). The current of each phase from current sensors 652, 654 and 656 attached to each phase (u, v and w) of the three-phase coils of the motor 622, a neutral point current from a current sensor 658 attached to the neutral point of the motor 622, a rotation angle of the rotor of the motor 622 from the rotation angle sensor 660 attached to the rotating shaft of the motor 622, and the like are input into the electronic control unit 640 through the input port thereof. Although the current sensors 652, 654, 656 and 658 for obtaining each phase current and the neutral point current are equipped, any one of the current sensors 652, 654, 656 and 658 can be omitted, and any one of them may be used as a sensor for abnormal detection use only. From the electronic control unit 640, the control signals for performing the switching control of the transistors TU1–TU4, TV1–TV4 and TW1–TW4 of the inverter circuit 624, and the like are output through the output port of the electronic control unit 640.

Figure 20:
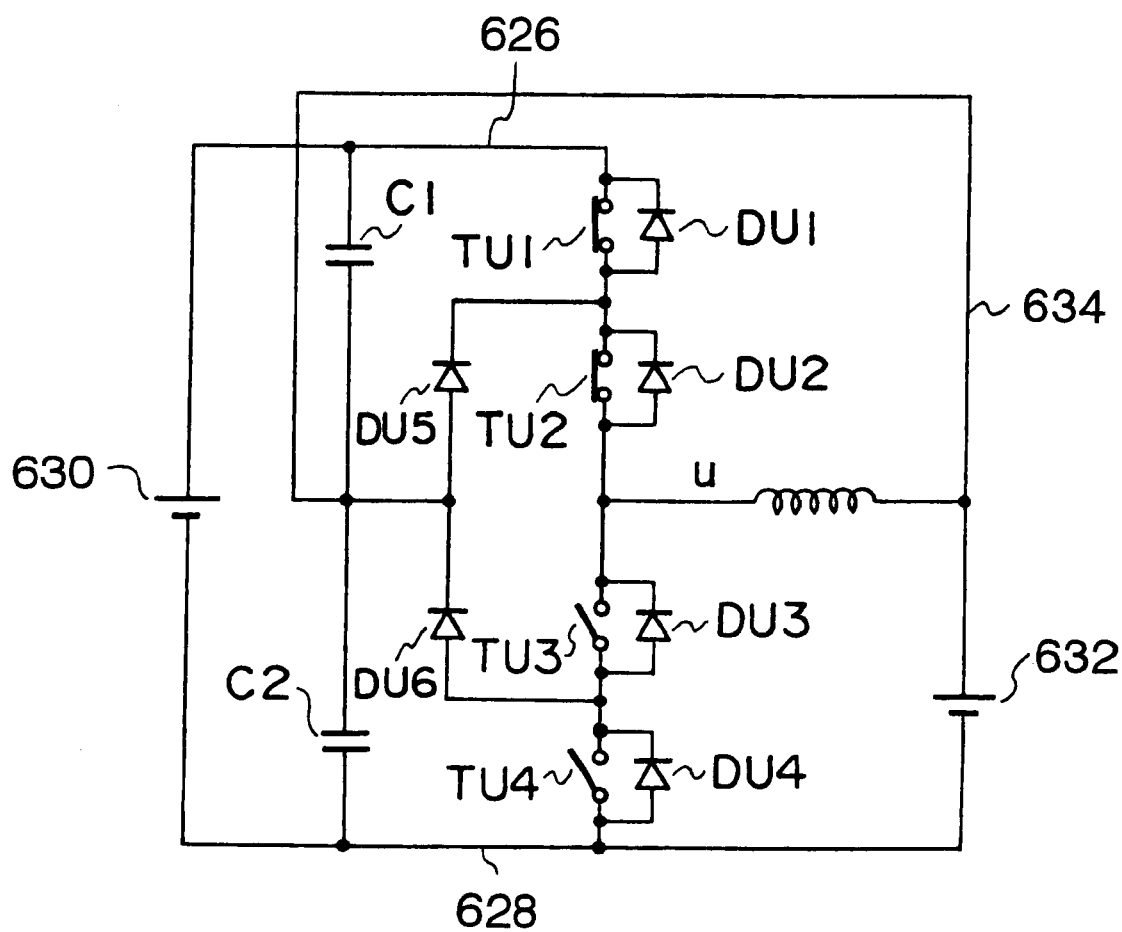
FIG. 20 is a circuit diagram of the mechanical power outputting apparatus 620 of the embodiment 5 when the u-phase, in a state where transistors TU1 and TU2 are turned on and transistors TU3 and TU4 are turned off, is noticed.
Figure 21:
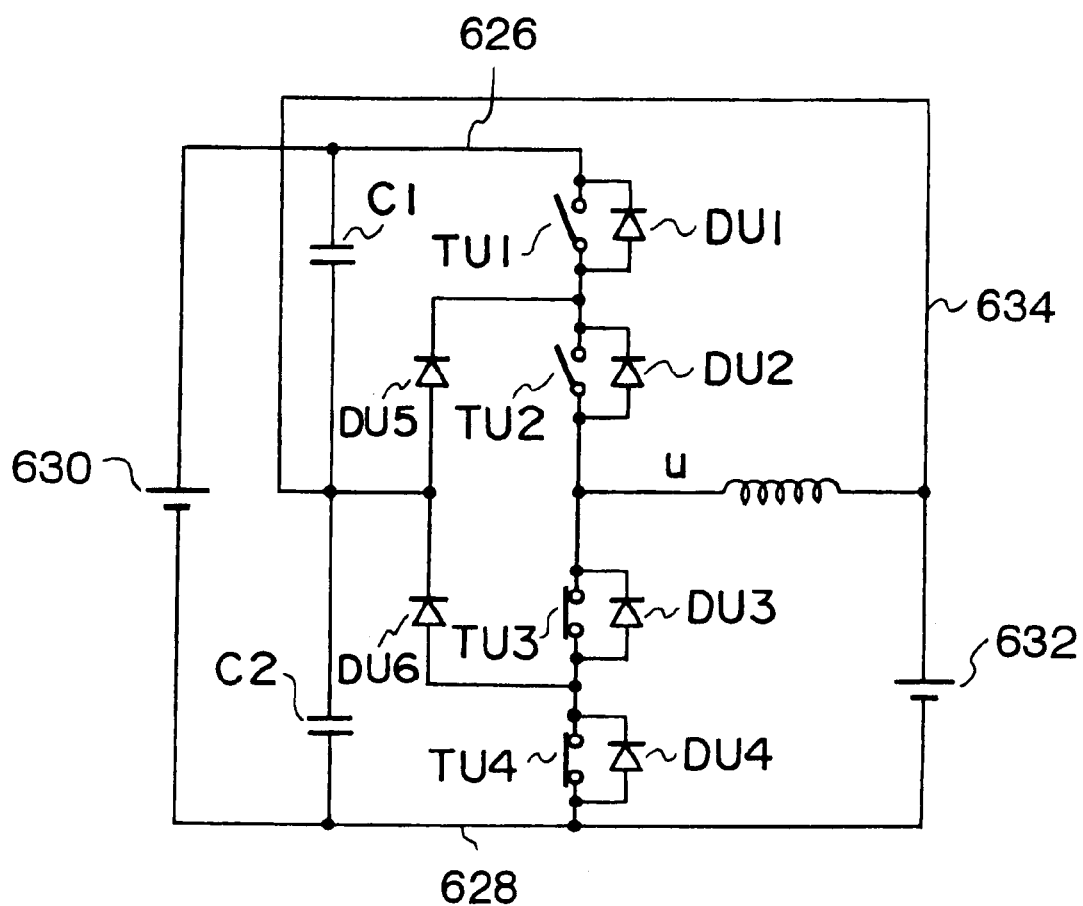
FIG. 21 is a circuit diagram of the mechanical power outputting apparatus 620 of the embodiment 5 when the u-phase, in a state where the transistors TU1 and TU2 are turned off and the transistors TU3 and TU4 are turned on, is noticed.
Figure 22:
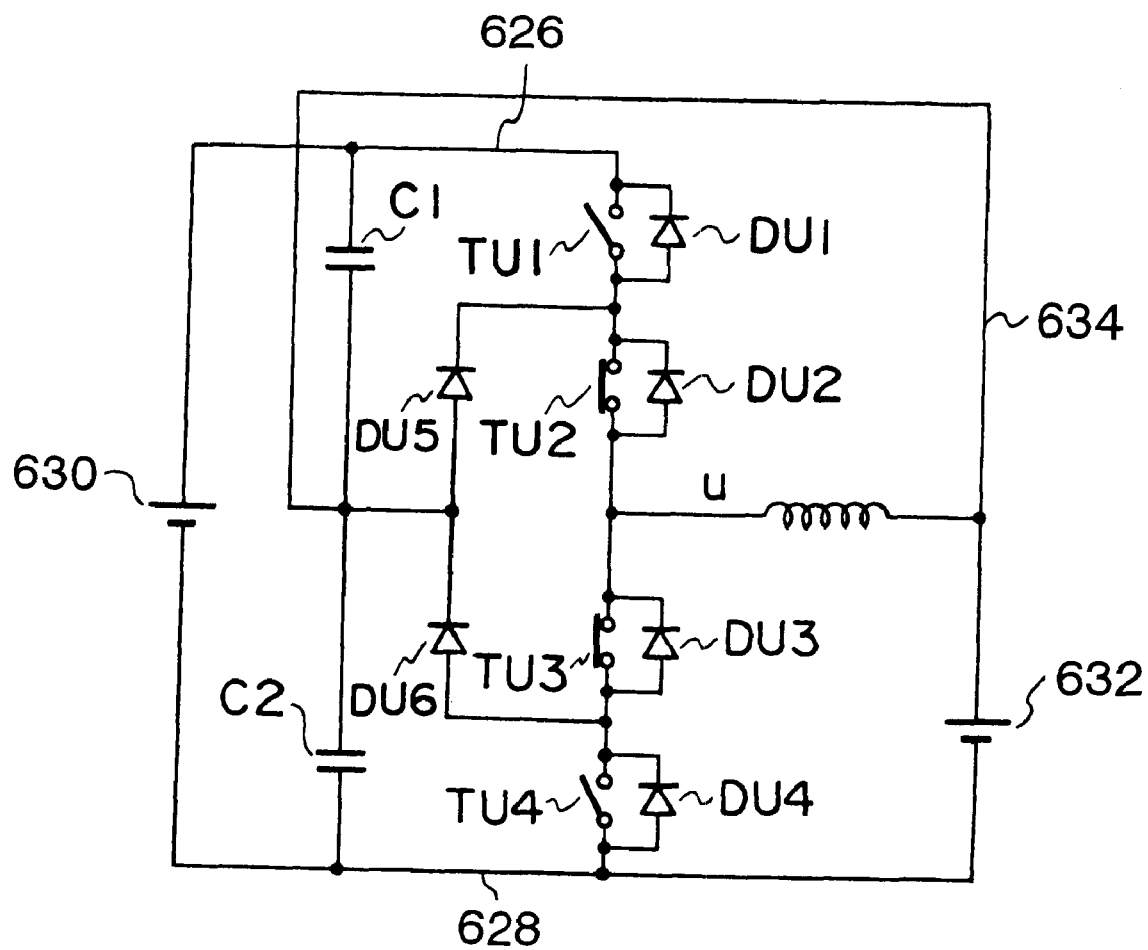
FIG. 22 is a circuit diagram of the mechanical power outputting apparatus 620 of the embodiment 5 when the u-phase, in a state where the transistors TU1 and TU4 are turned off and the transistors TU2 and TU3 are turned on, is noticed.

Next, the operation of the thus configured mechanical power outputting apparatus 620 of the embodiment 5, especially the forming of a pseudo-three-phase alternating current to be imposed on the motor 622 by the inverter circuit 624 will be described. The inverter circuit 624 with which the mechanical power outputting apparatus 620 of the embodiment 5 is provided can operate voltage levels of three steps on each phase of the motor 622 as follows. FIG. 20 is a circuit diagram of the mechanical power outputting apparatus 620 of the embodiment 5 when the u-phase is in a state where transistors TU1 and TU2 are turned on and transistors TU3 and TU4 are turned off. In this state, the voltage (½ VB) of positive pole bus 626 operates on the u-phase of the motor 622. FIG. 21 is a circuit diagram of the mechanical power outputting apparatus 620 of the embodiment 5 when the u-phase is in a state where the transistors TU1 and TU2 are turned off and the transistors TU3 and TU4 are turned on. In this state, the voltage (–½ VB) of the negative pole bus 628 operates on the u-phase of the motor 622. FIG. 22 is a circuit diagram of the mechanical power outputting apparatus 620 of the embodiment 5 when the u-phase is in a state where the transistors TU1 and TU4 are turned off and the transistors TU2 and TU3 are turned on. In this state, the voltage of the neutral point of the motor 622 (reference voltage: zero) operates. Consequently, it is possible to operate the voltage levels of three steps on the u-phase of the motor 622 by means of three switching patterns shown in FIGS. 20–22. Because the v-phase and the w-phase of the inverter circuit 624 are composed similarly to the u-phase, then with respect to the v-phase and the w-phase, the three steps of the voltage levels can also be operated on the v-phase and the w-phase of the motor 622.

Figure 23:
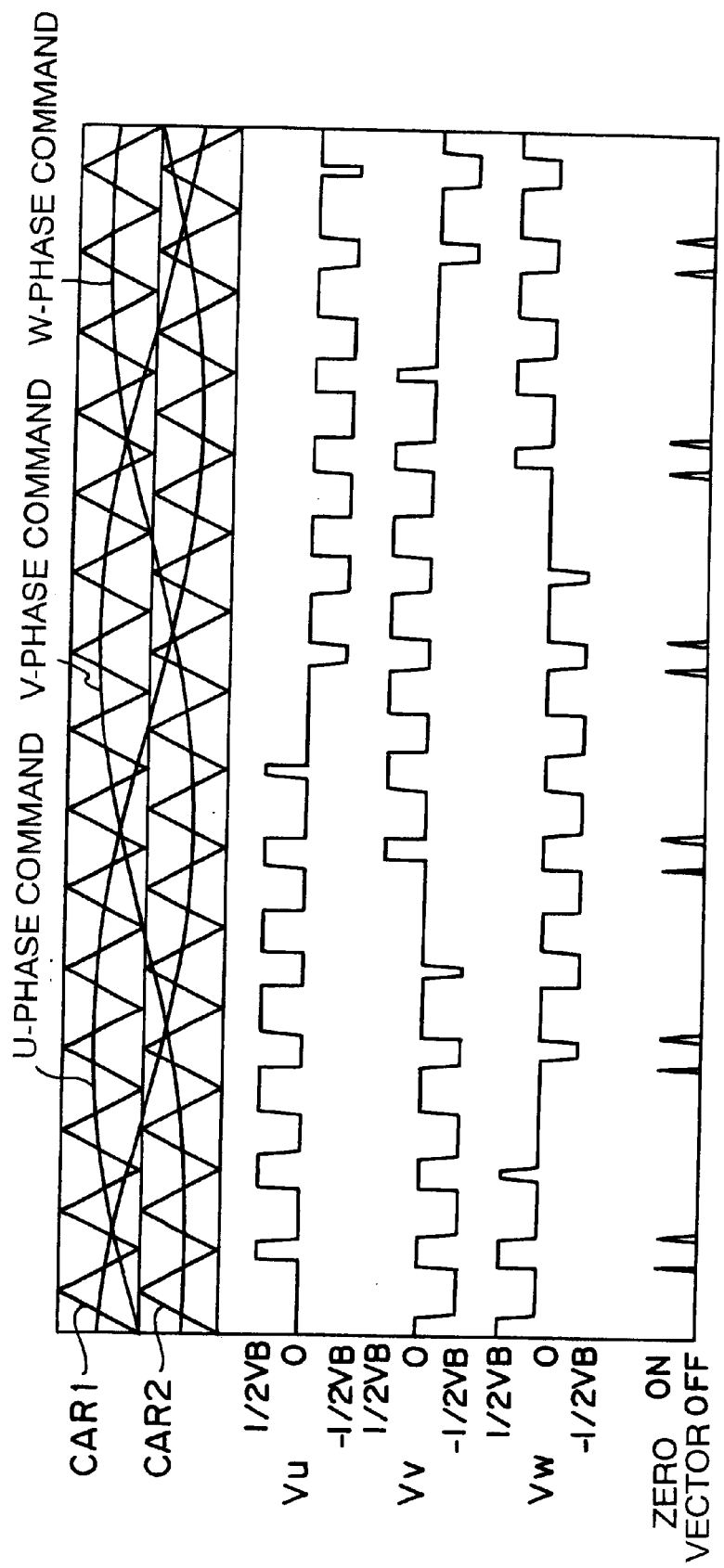
FIG. 23 is an explanatory view for illustrating the situation of the acquisition of the pseudo-three-phase alternating current by the switching of transistors TU1–TU4, TV1–TV4 and TW1–TW4 of an inverter circuit 624.

FIG. 23 is an explanatory view for illustrating the situation of the acquisition of the pseudo-three-phase alternating current by the switching of the transistors TU1–TU4, TV1–TV4 and TW1–TW4 of the inverter circuit 624. As shown in the figure, the states of the turning on or off of the respective transistors TU1–TU4, TV1–TV4 and TW1–TW4 are determined by the comparison of the magnitude of each of the respective phase commands (u, v and w) different from each other by 120 degrees with triangular carrier waves CAR1 and CAR2 that are hierarchically classified in two steps. The states of the command value Vu* of the u-phase and the states of the turning on and off of the transistors TU1–TU4 are shown in the following table 1.

TABLE 1

| | VOLTAGE | TU1 | TU2 | TU3 | TU4 |
|---|---|---|---|---|---|
| Vu* > CAR1 | 1/2 VB | ON | ON | OFF | OFF |
| CAR1 > Vu* > CAR2 | 0 | OFF | ON | ON | OFF |
| Vu* < CAR2 | -1/2 VB | OFF | OFF | ON | ON |

As is apparent from the table 1, when the command value Vu* of the u-phase is larger than the triangular carrier wave CAR1, the transistors TU1 and TU2 are turned on and the transistors TU3 and TU4 are turned off as shown in FIG. 20, and then the voltage (½ VB) of the positive pole bus 626 are made to operate on the u-phase of the three-phase coils. When the command value Vu* takes a value between the triangular carrier wave CAR1 an the triangular carrier wave CAR2, the transistors TU1 and TU4 are turned off and the transistors TU2 and TU3 are turned on as shown in FIG. 22, and then the voltage (zero) of the neutral point of the motor 622 is made to operate on the u-phase of the three-phase coils. When the command value Vu* is smaller than the triangular carrier wave CAR2, the transistors TU1 and TU2 are turned off and the transistors TU3 and TU4 are turned on as shown in FIG. 21, and then the voltage (–½ VB) of the negative pole bus 628 is made to operate on the u-phase of the three-phase coils.

Figure 24:
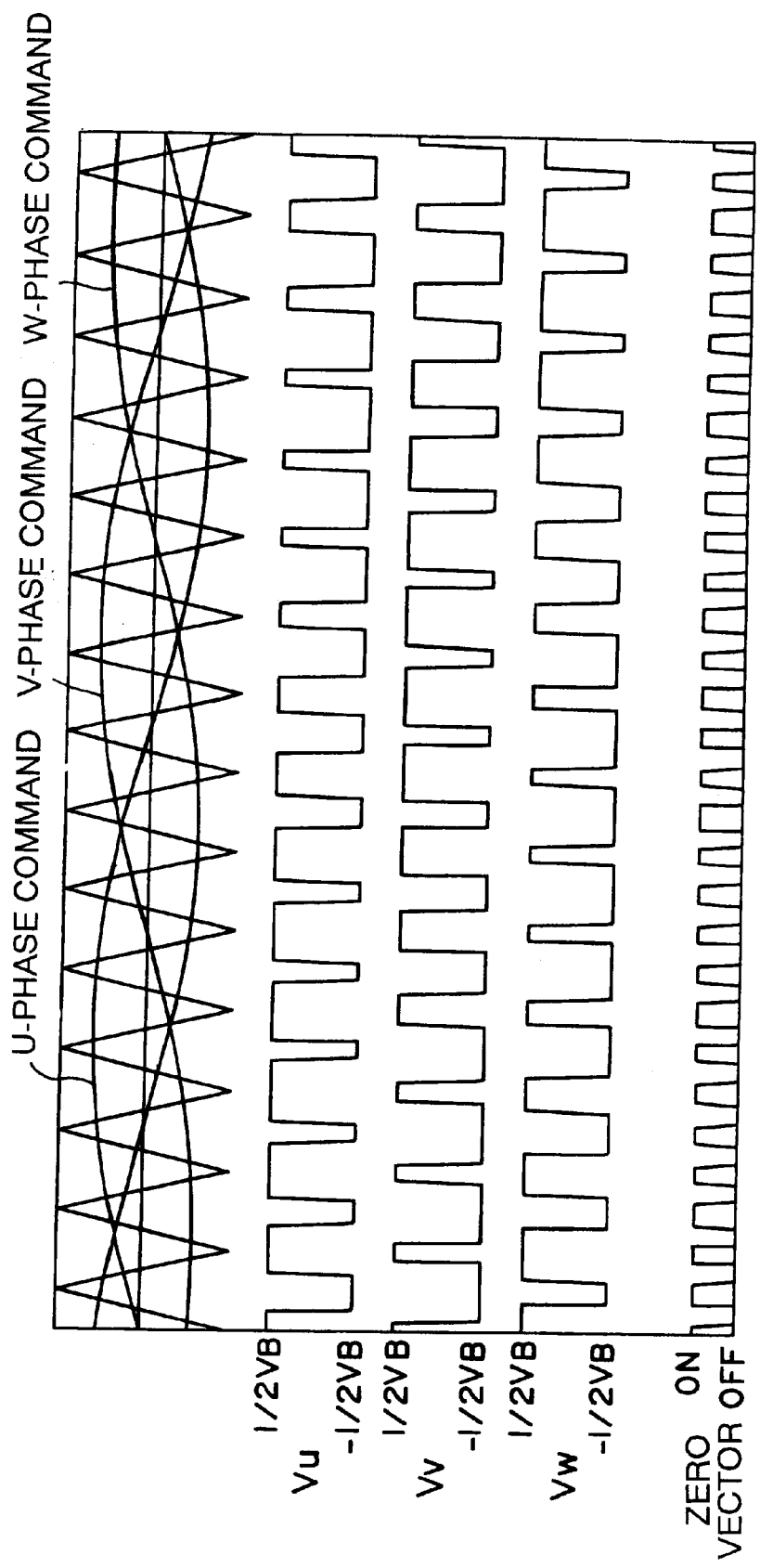
FIG. 24 is an explanatory view showing each phase command, a triangular carrier wave, the PWM waveform of each phase (Vu, Vv and Vw), and the outputs of the zero voltage vectors in a conventional mechanical power outputting apparatus.

When each of the transistors TU1–TU4, TV1–TV4 and TW1–TW4 is switched on the basis of such hierarchical triangular waves CAR1, CAR2 and each phase command, the PWM waveform of each phase (Vu, Vv and Vw) in the middle columns of FIG. 23 is obtained. The outputs of the zero voltage vectors in which the voltage of each phase becomes identical is one shown in the lowest column of FIG. 23 from such waveform of the PWM of each phase. Each phase command, a triangular carrier wave, the PWM waveform of each phase (Vu, Vv and Vw) and the zero voltage vectors in a conventional mechanical power outputting apparatus that performs the PWM control thereof by means of two steps of voltage levels of a positive pole bus voltage (½ VB) and a negative pole bus voltage (−½ VB) are shown in FIG. 24. As will be understood from the comparison of FIG. 23 and FIG. 24, the mechanical power outputting apparatus 620 of the embodiment 5 can decrease the frequency of the outputs of the zero voltage vectors in a great extent by performing the PWM control thereof with voltage levels of three steps in comparison with the conventional mechanical power outputting apparatus that performs the PWM control thereof with the voltage levels of two steps. Consequently, the outputs of the zero voltage vectors and the current pulsations generated by the fixation of the electrical potential of the neutral point of the motor 622 can be decreased.

According to the mechanical power outputting apparatus 620 of the embodiment 5, the frequency of the outputs of the zero voltage vectors can be decreased to a great extent by the execution of the PWM control thereof with voltage levels of three steps. As a result, the current pulsations that can be generated at the neutral point of the motor 622 with the output of the zero voltage vector can be decreased, and the loss of the motor 622 can be suppressed.

Figure 25:
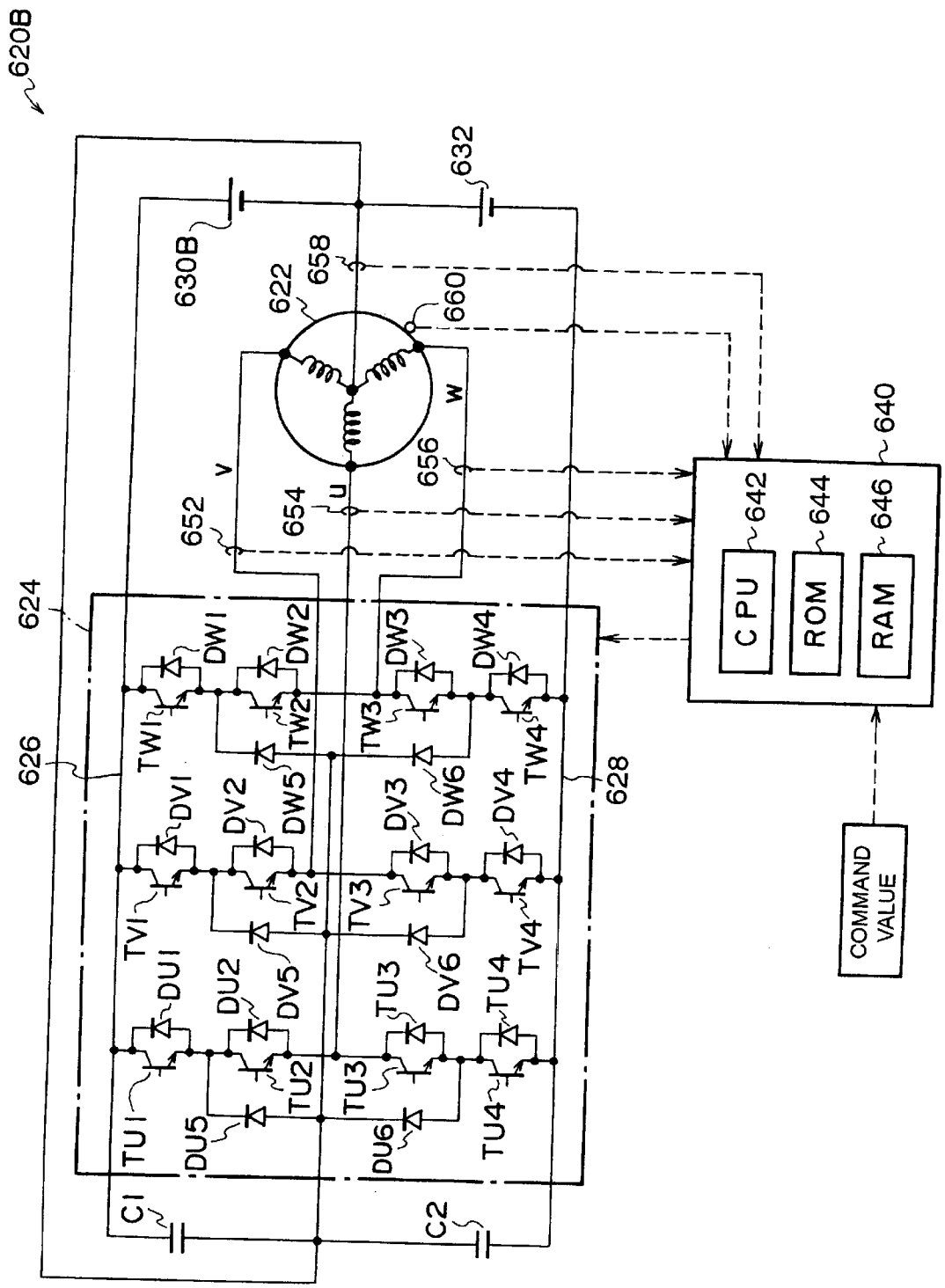
FIG. 25 is a schematic diagram showing an outline of the configuration of a modified mechanical power outputting apparatus 620B.

Although, in the mechanical power outputting apparatus 620 of the embodiment 5, the second direct-current power supply 632 is attached to connect the negative pole bus 628 of the inverter circuit 624 with the neutral point of the motor 622, the second direct-current power supply 632 may be attached to connect the positive pole bus 626 of the inverter circuit 624 with the neutral point of the motor 622. Moreover, although, in the mechanical power outputting apparatus 620 of the embodiment 5, the first direct-current power supply 630 having the voltage V1 being twice as large as the voltage V2 of the second direct-current power supply 632 is attached to connect the positive pole bus 626 with the negative pole bus 628 of the inverter circuit 624, a first direct-current power supply 630B having the same voltage as the voltage V2 of the second direct-voltage power supply 632 may be attached to connect the positive pole bus 626 of the inverter circuit 624 and the neutral point of the motor 622 as the modified mechanical power outputting apparatus 620B of FIG. 25. The reason for this is that the modified mechanical power outputting apparatus 620B is electrically equivalent to the mechanical power outputting apparatus 620 of the embodiment 5.

Figure 26:
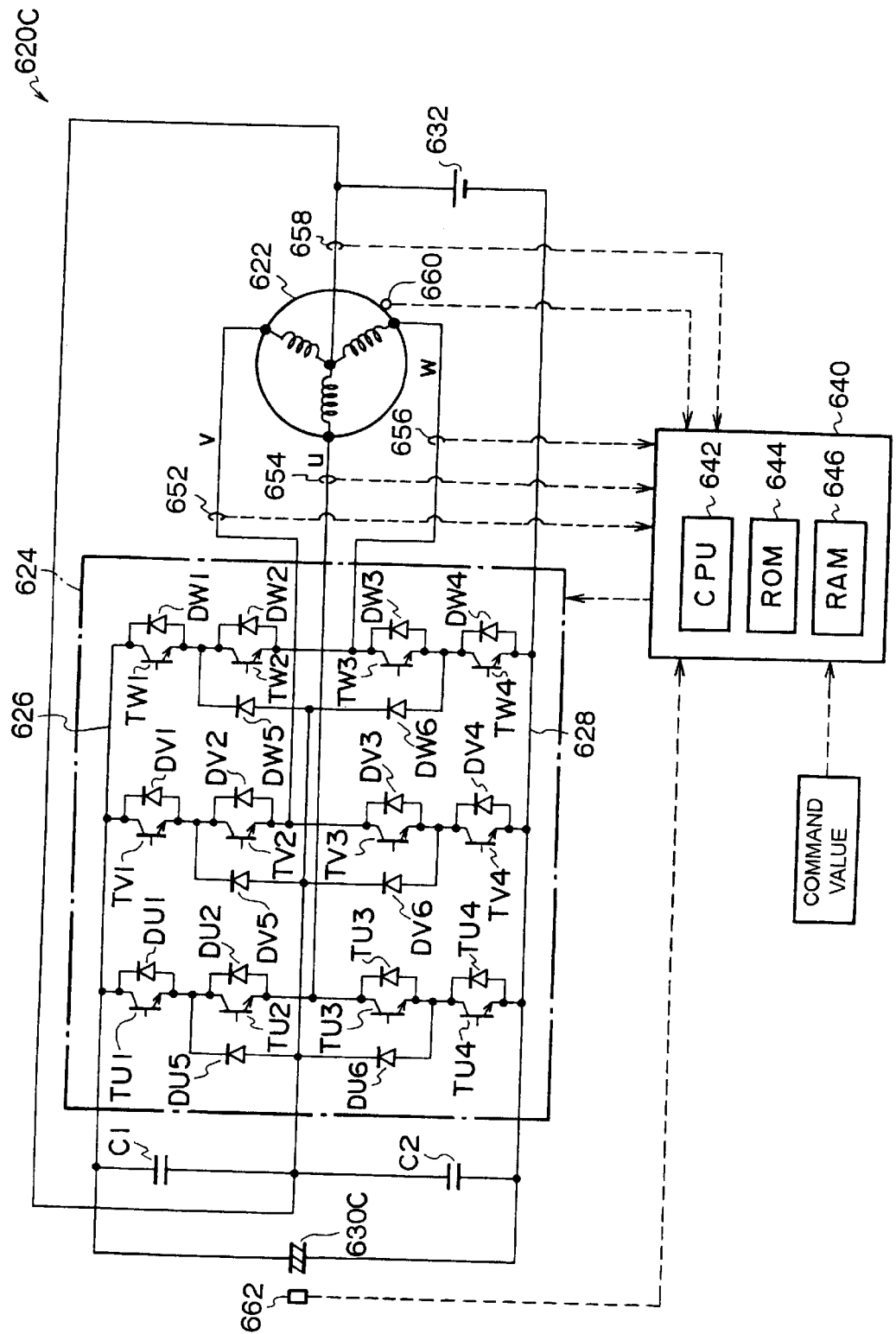
FIG. 26 is a schematic diagram showing an outline of the configuration of another modified mechanical power outputting apparatus 620C.
Figure 27:
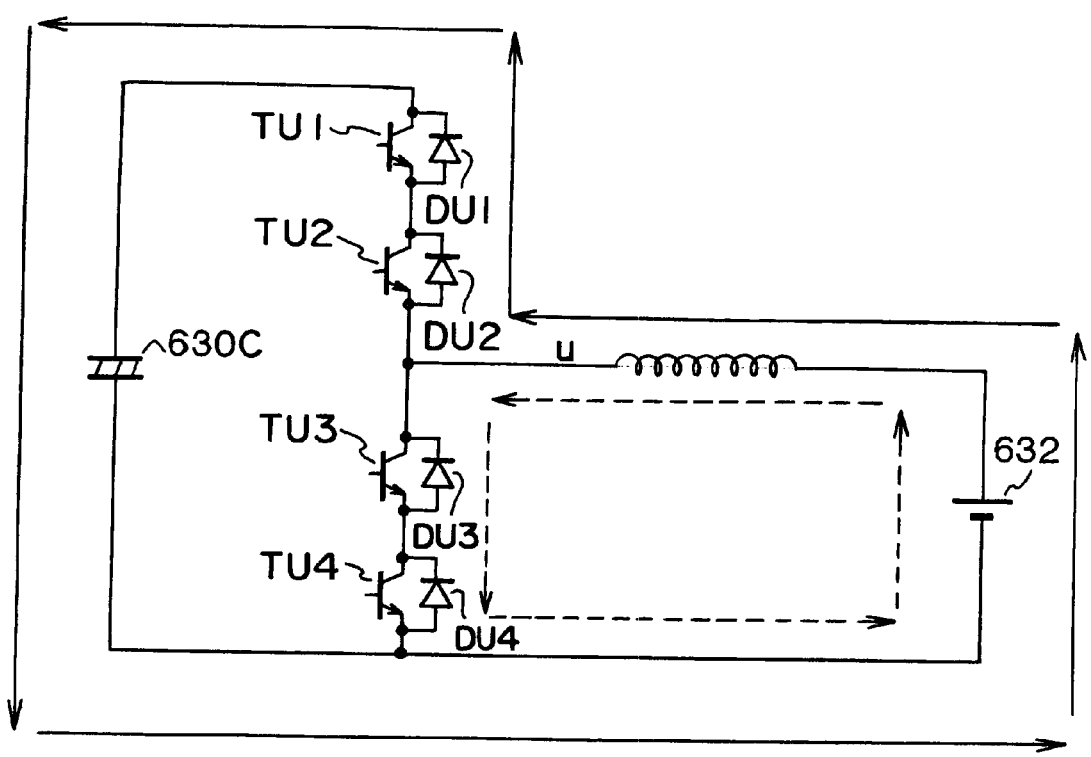
FIG. 27 is a circuit diagram of the mechanical power outputting apparatus 620C of the modified embodiment 5 when the leakage inductance of the three-phase coils of a motor 622 is noticed.

Although, in the mechanical power outputting apparatus 620 of the embodiment 5, the first direct-current power supply 630 connecting the positive pole bus 626 and the negative pole bus 628 of the inverter circuit 624 is provided, a capacitor 630C may be provided in place of the first direct-current power supply 630 as the modified mechanical power outputting apparatus 620C of FIG. 26. Incidentally, the modified mechanical power outputting apparatus 620C shown in FIG. 26 is equipped with a voltage sensor 662 for detecting the voltage Vc between the terminals of the capacitor 630C, and a detection signal from the voltage sensor 662 is inputted to the electronic control unit 640 through the input port thereof. FIG. 27 is a circuit diagram of the modified mechanical power outputting apparatus 620C when the leakage inductance of the three-phase coils of a motor 622 is noticed. Now, when a state in which the transistors TU3 and TU4 of the u-phase of the inverter circuit 624 are turned on is considered, a short circuit shown by the broken arrows in the figure is formed, and the u-phase of the three-phase coils of the motor 622 functions as a reactor. When either of the transistor TU3 or TU4 is turned off, the energy that is stored in the u-phase of the three-phase coils that functions as a reactor is stored in the capacitor 630C through the charging circuit shown by the solid arrows in the figure. The charged voltage in this case can be higher than the supply voltage of the second direct-current power supply 632. On the other hand, the second direct-current power supply 632 can also be charged by means of the electrical potential of the capacitor 630C in the circuit. Consequently, the circuit can be regarded as a step-up and step-down chopper circuit that steps up the energy of the second direct-current power supply 632 to store it in the capacitor 630C and can charge the second direct-current power supply 632 by means of the electrical potential of the capacitor 630C. Because the v-phase and the w-phase of the three-phase coils of the motor 622 can also be regarded as a step-up and step-down chopper circuit like the u-phase thereof, the capacitor 630C can be charged by the execution of the turning on and off of the transistors TU3, TU4, TV3, TV4, TW3 and TW4, and the second direct-current power supply 632 can be charged by means of the electrical potential of the capacitor 630C.

With such charging, a potential difference is generated between the terminals of the capacitor 630C, and the potential difference can be controlled by the adjustment of the quantity of the charge stored in the capacitor 630C, i.e. the current flowing through the reactor. Consequently, the voltage Vc between the terminals of the capacitor 630C can also be made to be twice as large as the voltage V2 of the second direct-current power supply 632. If the voltage Vc between the terminals of the capacitor 630C is thus made to be twice as large as the voltage V2 of the second direct-current power supply 632, the modified mechanical power outputting apparatus 620C shown in the FIG. 26 is in a state where a voltage Vc between the terminals of the capacitor 630C operates on the positive pole bus 626 and the negative pole bus 628, i.e. a state where a direct-current power supply corresponding to the first direct-current power supply 630 of the mechanical power outputting apparatus 620 of the embodiment 5 is connected between the positive pole bus 626 and the negative pole bus 628. Then, the motor 622 can be driven similarly to the mechanical power outputting apparatus 620 of the embodiment 5.

Because the motor 622 can be driven by the supply of a pseudo-three-phase alternating current generated by the switching control of the transistors TU1–TU4, TV1–TV4 and TW1–TW4 that compose the inverter circuit 624 and the charging of the capacitor 630C can be performed with a direct-current component, the three-phase alternating current including the direct-current component can be supplied to the motor 622 by the offsetting of the electric potentials of a pseudo-three-phase alternating current to the plus side or the minus side. As a result, it is possible to drive the motor 622 to rotate by means of the alternating-current component and to charge the capacitor 630C by means of the direct-current component as described with respect to FIG. 27.

Consequently, the modified mechanical power outputting apparatus 620C can perform the control similar to the PWM control of each phase of the mechanical power outputting apparatus 620 of the embodiment 5 by offsetting each phase command shown in FIG. 23 to the plus side or the minus side, and can control the voltage Vc between the terminals of the capacitor 630C. As a result, the modified mechanical power outputting apparatus 620C can also possess advantages similar to those of the mechanical power outputting apparatus 620 of the embodiment 5.

Figure 28:
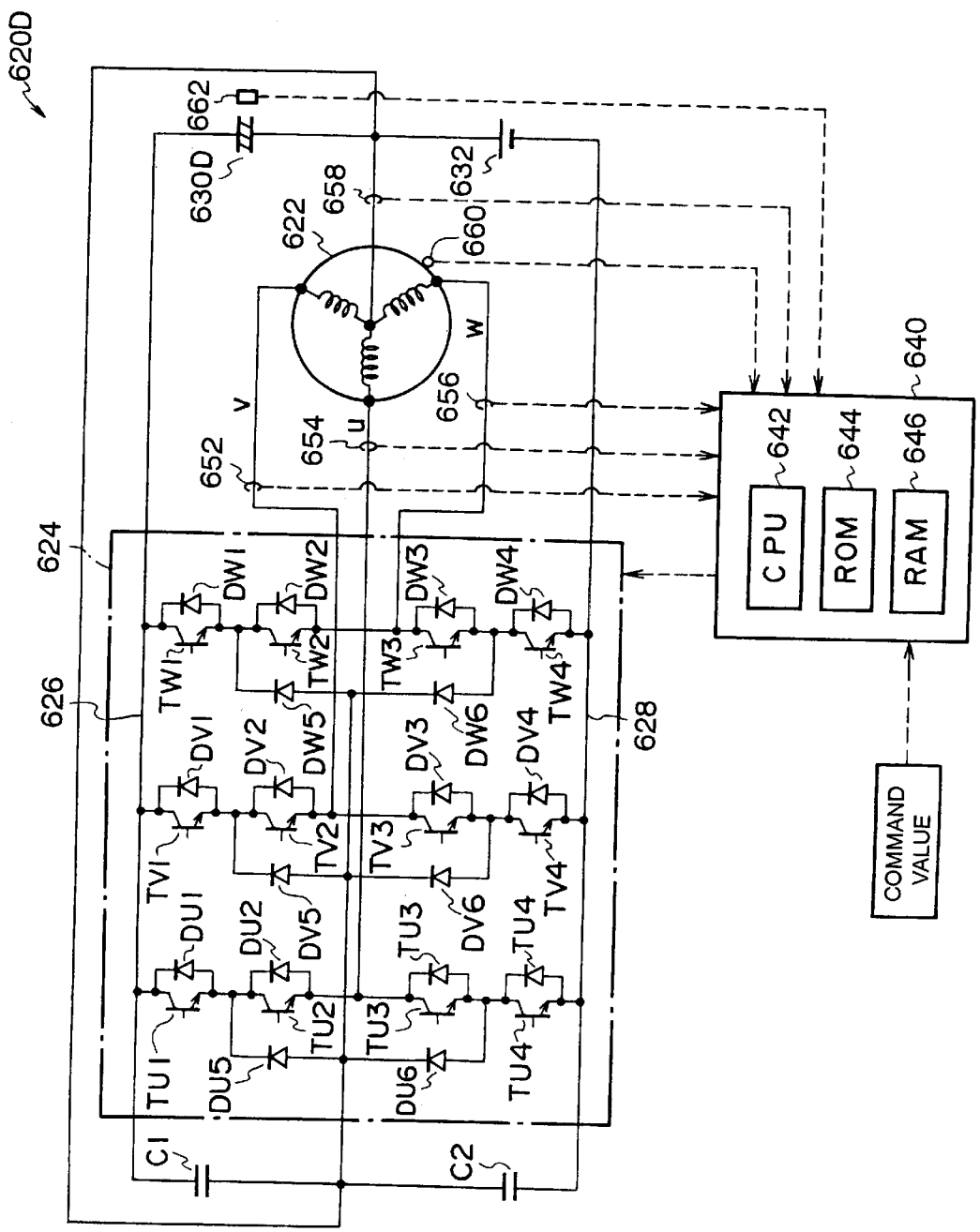
FIG. 28 is a schematic diagram showing an outline of the configuration of still another modified mechanical power outputting apparatus 620D.
Figure 29:
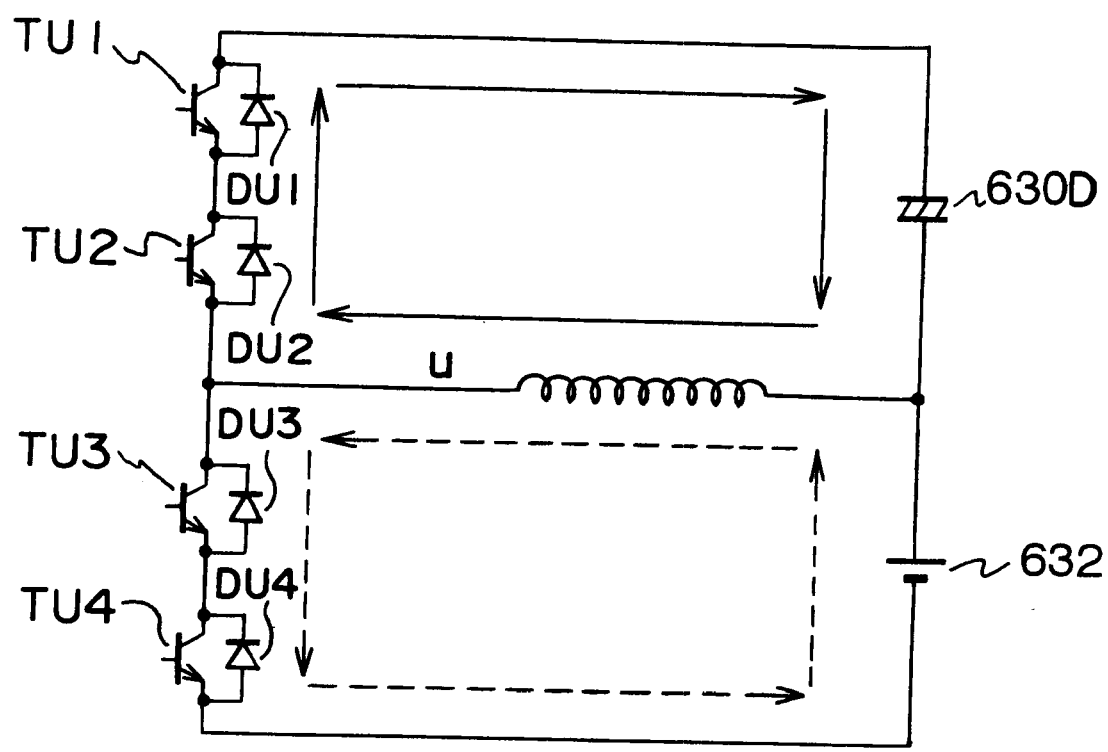
FIG. 29 is a circuit diagram of the mechanical power outputting apparatus 620D of the modified embodiment 5 when the leakage inductance of the three-phase coils of the motor 622 is noticed.

Although the mechanical power outputting apparatus 620 of the embodiment 5 is equipped with the first direct-current power supply 630 connecting the positive pole bus 626 and the negative pole bus 628 of the inverter circuit 624, the mechanical power outputting apparatus may be equipped with a capacitor 630D connecting the positive pole bus 626 of the inverter circuit 624 and the neutral point of the motor 622 in place of the first direct-current power supply 630 as the modified mechanical power outputting apparatus 620D of FIG. 28. Incidentally, the modified mechanical power outputting apparatus 620D shown in FIG. 28 is also equipped with a voltage sensor 662 for detecting the voltage Vc between the terminals of the capacitor 630D, like the modified mechanical power outputting apparatus 620C, and the detection signal of the voltage sensor 662 is input into the electronic control unit 640 through the input port. FIG. 29 is a circuit diagram of a modified mechanical power outputting apparatus 620D when the leakage inductance of the three-phase coils of the motor 622 is noticed. Now, when a state in which the transistors TU3 and TU4 of the u-phase of the inverter circuit 624 are turned on is considered, a short circuit shown by the broken arrows in the figure is formed, and the u-phase of the three-phase coils of the motor 622 functions as a reactor. When either of the transistor TU3 or TU4 is turned off, the energy that is stored in the u-phase of the three-phase coils that functions as a reactor is stored in the capacitor 630D through the charging circuit shown by the solid arrows in the figure. Consequently, the circuit can be regarded as a chopper circuit that steps up the energy of the second direct-current power supply 632 to store it in the capacitor 630D and can charge the second direct-current power supply 632 by means of the electrical potential of the capacitor 630D. Because the v-phase and the w-phase of the three-phase coils of the motor 622 can also be regarded as a chopper circuit like the u-phase thereof, the capacitor 630D can be charged by the execution of the turning on and off of the transistors TU1–TU4, TV1–TV4 and TW1–TW4, and the second direct-current power supply 632 can be charged by means of the electrical potential of the capacitor 630D.

With such charging, a potential difference is generated between the terminals of the capacitor 630D, and the potential difference can be controlled by the adjustment of the quantity of the charge stored in the capacitor 630D, i.e. the current flowing through the reactor. Consequently, the voltage Vc between the terminals of the capacitor 630D can also be made equal to the voltage V2 of the second direct-current power supply 632. If the voltage Vc between the terminals of the capacitor 630D is thus made to be equal to the voltage V2 of the second direct-current power supply 632, the modified mechanical power outputting apparatus 620D shown in the FIG. 29 is in a state where a direct-current power supply that has a voltage twice as large as the voltage V2 and is composed of the capacitor 630D and the second direct-current power supply 632 is connected between the positive pole bus 626 and the negative pole bus 628, i.e. the state where a direct-current power supply corresponding to the first direct-current power supply 630 of the mechanical power outputting apparatus 620 of the embodiment 5 is connected between the positive pole bus 626 and the negative pole bus 628. Then, the motor 622 can be driven similarly to the mechanical power outputting apparatus 620 of the embodiment 5.

Because the motor 622 can be driven by the supply of a pseudo-three-phase alternating current generated by the aforesaid switching control of the transistors TU1–TU4, TV1–TV4 and TW1–TW4 that compose the inverter circuit 624 and the charging of the capacitor 630D can be performed with a direct-current component, the three-phase alternating current including the direct-current component can be supplied to the motor 622 by the offsetting of the electric potentials of the pseudo-three-phase alternating current to the plus side or the minus side. As a result, it is possible to drive the motor 622 to rotate by means of the alternating-current component and to charge the capacitor 630D by means of the direct-current component as described with respect to FIG. 29.

Consequently, the modified mechanical power outputting apparatus 620D can perform the control similar to the PWM control of each phase of the mechanical power outputting apparatus 620 of the embodiment 5 by offsetting each phase command shown in FIG. 23 to the plus side or the minus side and can control the voltage Vc between the terminals of the capacitor 630D similarly to the modified mechanical power outputting apparatus 620C. As a result, the modified mechanical power outputting apparatus 620D can also possess advantages similar to those of the mechanical power outputting apparatus 620 of the embodiment 5.

Although, in the mechanical outputting apparatus 620 of the embodiment 5 and the variations thereof, the intermediate connection point of each phase of the diodes DU5, DU6, DV5, DV6, DW5 and DW6 is connected with the intermediate connection point of the capacitors C1 and C2 and is connected with the neutral point of the motor 622 with the connection line 634, the intermediate connection point of each phase of the diodes DU5, DU6, DV5, DV6, DW5 and DW6 may simply be connected with the neutral point of the motor 622 with the connection line 634 without being equipped with the capacitors C1 and C2, and the intermediate connection point of each phase of the diodes DU5, DU6, DV5, DV6, DW5 and DW6 may simply be connected with the intermediate connection point of the capacitors C1 and C2 without being connected with the neutral point of the motor 622 with the connection line 634.

Although, in the mechanical power outputting apparatus 620 of the embodiment 5 and the variations thereof, the appearance frequency of the zero voltage vectors is decreased by the execution of the PWM control of the voltage levels of three steps, the appearance frequency of the zero voltage vectors may be decreased by the execution of the PWM control of the voltage levels of four steps or more. Moreover, although, in the mechanical power outputting apparatus 620 of the embodiment 5 and the variations thereof, the motor driven by the three-phase alternating current is used, a motor driven by n-phase alternating current may be used. In this case also, the appearance frequency of the zero voltage vectors may be decreased by the execution of the PWM control by the voltage levels of three steps or four steps or more.

EMBODIMENT 6

Figure 30:
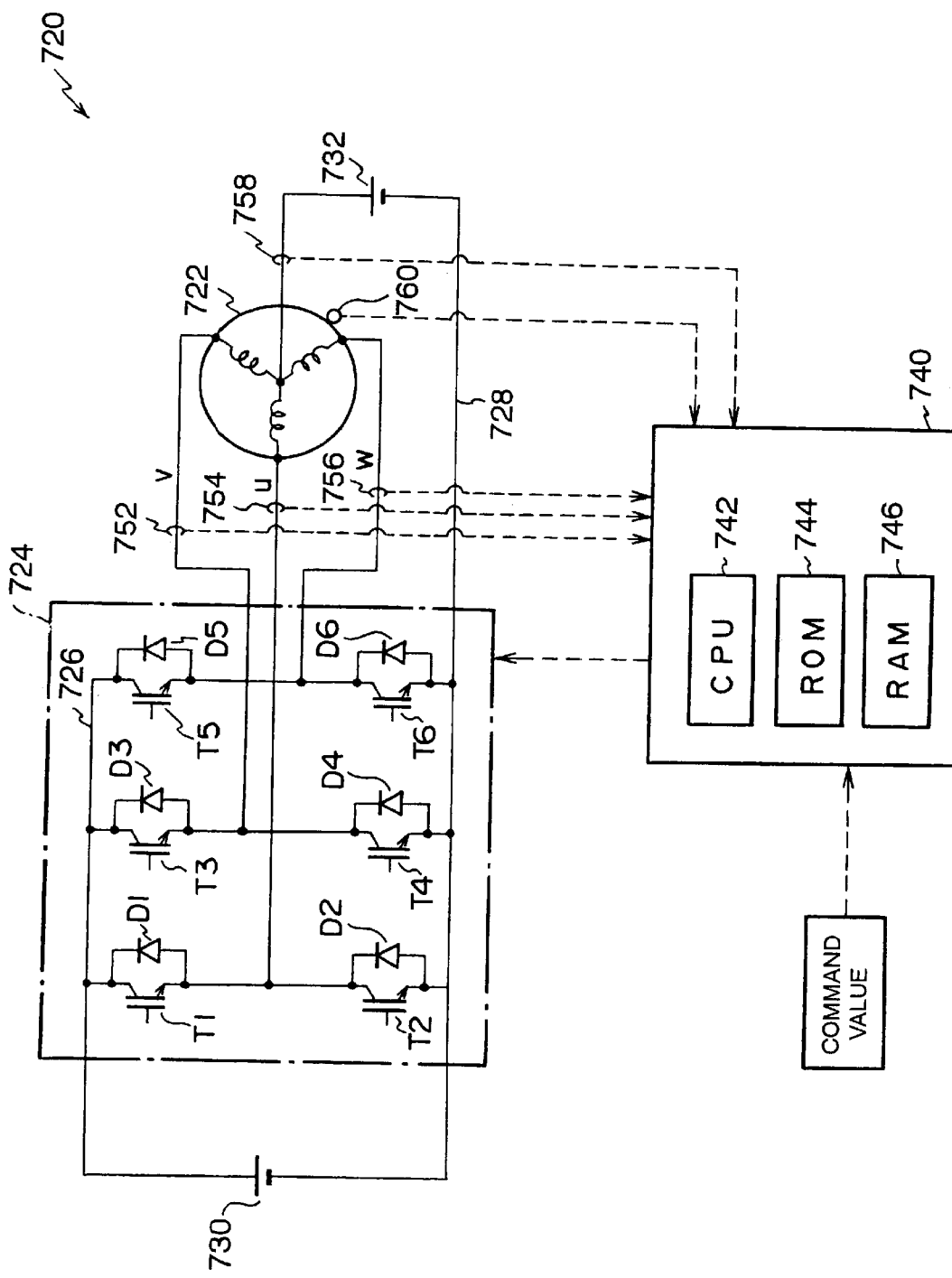
FIG. 30 is a schematic diagram showing an outline of the configuration of a mechanical power outputting apparatus 720 of a sixth embodiment (embodiment 6)

Next, the mechanical power outputting apparatus 720 as the embodiment 6 of the present invention will be described. FIG. 30 is a schematic diagram showing the outline of the configuration of the mechanical power outputting apparatus 720 of the embodiment 6. The mechanical power outputting apparatus 720 of the embodiment 6 comprises, as shown in the figure, a motor 722 driven to rotate by a three-phase alternating current, an inverter circuit 724 capable of converting direct-current power into three-phase alternating-current power to supply it to the motor 722, a first direct-current power supply 730 connected between a positive pole bus 726 and a negative pole bus 728 of the inverter circuit 724, a second direct-current power supply 732 connected between the negative pole bus 728 of the inverter circuit 724 and the neutral point of the motor 722, and an electronic control unit 740 to control the whole apparatus.

The motor 722 is, like the motor 622 of the mechanical power outputting apparatus of the embodiment 5, composed as a synchronous generation dynamo-electric motor that is capable of generating electrical energy and is constituted of a rotor on the outer surface of which a permanent magnet is affixed and a stator on which three-phase coils are wound.

The inverter circuit 724 is composed of six transistors T1–T6 and six diodes D1–D6. The six transistors T1—T1 are arranged as three pairs of two between the positive pole bus 726 and the negative pole bus 728 so that one of the paired transistors is on the source side and the other of them is on the sink side, respectively, and each of the three-phase coils (u, v and w) of the motor 722 is connected with each of the connection points of the pairs. Accordingly, if the ratios of the periods of time when the paired transistors T1–T6 are turning on are controlled in a state that voltages operate on the positive pole bus 726 and the negative pole bus 728, the three-phase coils of the motor 722 form a rotating magnetic field that can drive the motor 722 to rotate by the PWM control of the voltage levels of two steps of the voltage of the positive pole bus 726 and the voltage of the negative pole bus 728.

The first direct-current power supply 730 and the second direct-current power supply 732 are also structured as a secondary battery, for example, in a nickel hydrogen series or in a lithium ion series similarly to the fist direct-current power supply 630 and the second direct-current power supply 632. The voltage V1 between the terminals of the first direct-current power supply 730 and the voltage V2 between the terminals of the second direct-current power supply 732 are adjusted so that the voltage V1 is about twice as large as the voltage V2. Consequently, when the neutral point of the motor 722 is taken as a reference, the electrical potential of the positive pole bus 726 is V1–V2, and the electrical potential of the negative pole bus 728 is –V2 similarly to the case of the mechanical power outputting apparatus 620 of the embodiment 5. Hereinafter, the voltage of the positive pole bus 726 taken to be ½ VB and the voltage of the negative pole bus 728 is taken to be –½ VB for the following consideration.

The electronic control unit 740 is composed as a microprocessor centering on a CPU 742, and the electronic control unit 740 comprises a ROM 744 that stores a processing program, a RAM 746 that temporarily stores data and an input/output port (not shown) similarly to the electronic control unit 640 of the mechanical power outputting apparatus 620 of the embodiment 5. The current of each phase from current sensors 752, 754 and 756 attached to each phase (u, v and w) of the three-phase coils of the motor 722, a neutral point current from a current sensor 758 attached to the neutral point of the motor 722, a rotation angle of the rotor of the motor 722 from a rotation angle sensor 760 attached to the rotating shaft of the motor 722, a command value with respect to the action of the motor 722, and the like, are input into the electronic control unit 740 through the input port thereof. Moreover, from the electronic control unit 740, the control signals for performing the switching control of the transistors T1–T6 of the inverter circuit 724, and the like are output through the output port of the electronic control unit 740.

Figure 31:
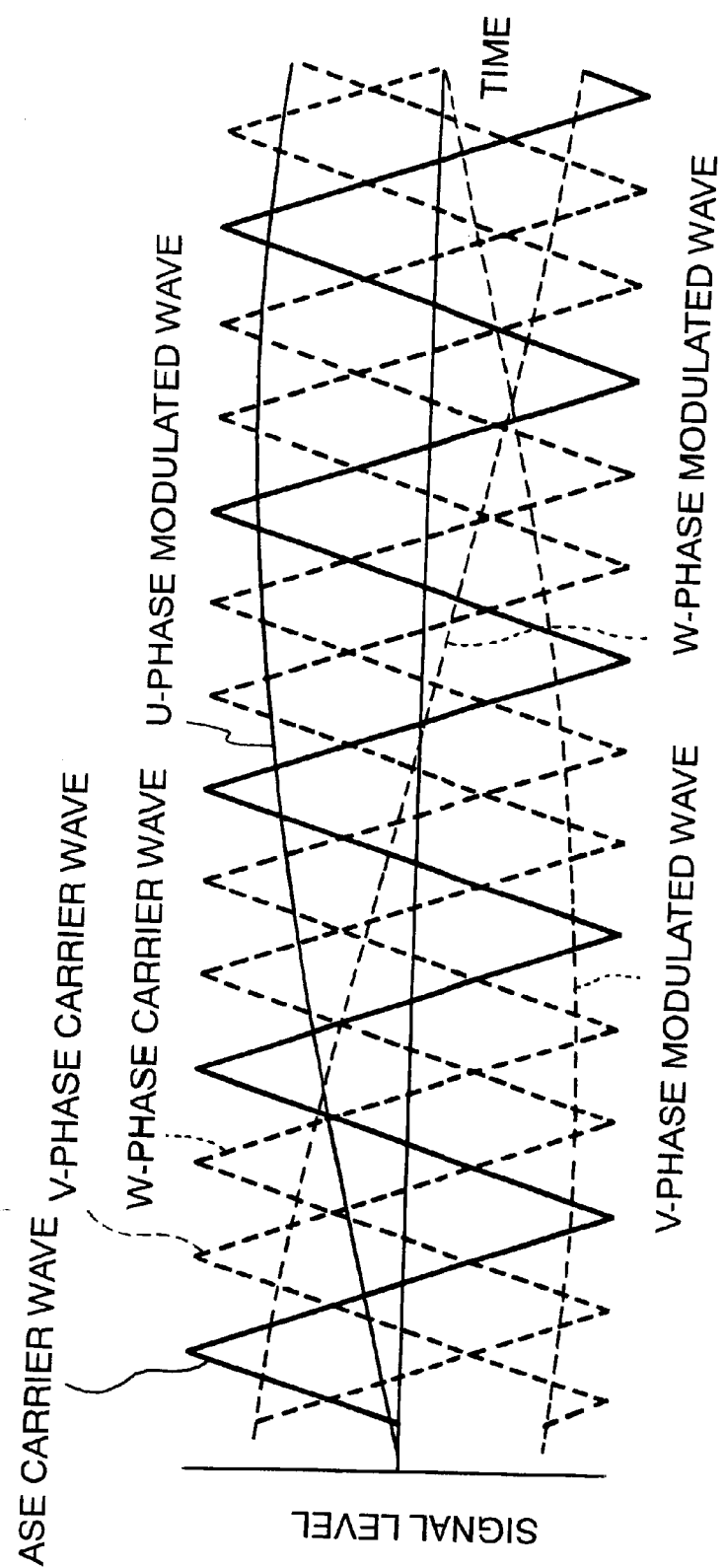
FIG. 31 is an explanatory view for illustrating an example of the modulated wave of each phase and the carrier wave of each phase for the use of the PWM control by an electronic control unit 740 of the mechanical power outputting apparatus 720 of the embodiment 6.

Next, the operation of the thus configured mechanical power outputting apparatus 720 of the embodiment 6, especially the forming of a pseudo-three-phase alternating current to be imposed on the motor 722 by the inverter circuit 724 will be described. FIG. 31 is the explanatory view for illustrating an example of the modulated wave of each phase and the carrier wave of each phase for the use of the PWM control by the electronic control unit 740 of the mechanical power outputting apparatus 720 of the embodiment 6. As shown in the figure, any of the u-phase carrier wave, the v-phase carrier wave and the w-phase carrier wave is a triangular wave and each has a phase different from the other by 120 degrees. Any of the u-phase modulated wave, the v-phase modulated wave and the w-phase modulated wave is formed on the basis of a command of each phase. Because each phase is similar, although it is different in phase, the description will be given for the u-phase. When the u-phase modulated wave is larger than the u-phase carrier wave, the transistor T1 is turned on and the transistor T2 is turned off, and thereby the voltage (½ VB) of the positive pole bus 726 is operated on the u-phase of the three-phase coils of the motor 722. On the other hand, when the u-phase modulated wave is smaller than the u-phase carrier wave, the transistor T1 is turned off and the transistor T2 is turned on, and thereby the voltage (–½ VB) of the negative pole bus 728 is operated on the u-phase of the three-phase coils of the motor 722. By the execution of such switching control, as shown in FIG. 31, the PWM control by the voltage levels of two steps can be performed similarly to the conventional mechanical power outputting apparatus. As for the v-phase and the w-phase, waveforms of the PWM control by each phase modulated wave and each phase carrier wave can be similarly obtained. However, because the carrier wave of each phase is made to be different in phase from each other by 120 degrees, the waveforms do not take the waveform of each phase (Vu, Vv and Vw) of FIG. 24, and thereby the appearance frequency of the zero voltage vectors becomes small.

Figure 32:
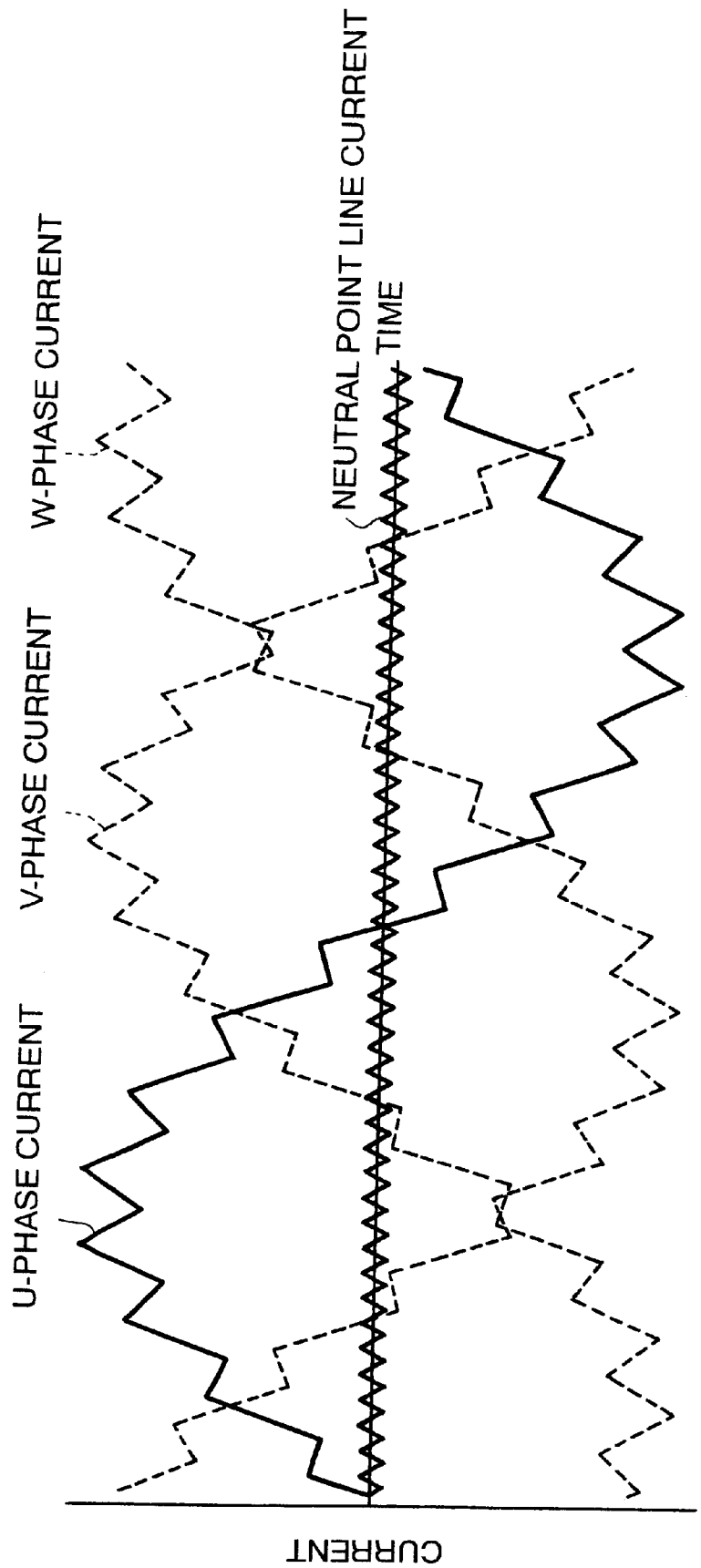
FIG. 32 is an explanatory view for illustrating the currents flowing through each phase coil and the neutral point of a motor 722 at the time of the switching based on the modulated wave of each phase and the carrier wave of each phase of FIG. 31.

FIG. 32 is the explanatory view for illustrating the currents flowing through each phase coil and the neutral point of the motor 722 at the time of the switching base on the modulated wave of each phase and the carrier wave of each phase of FIG. 31. As shown in the figure, each phase current becomes a pseudo-three-phase alternating current having a phase different from each other by 120 degrees, the current at the neutral point of the motor 722 is settled within small amplitudes in the vicinity of zero.

According to the mechanical power outputting apparatus 720 of the embodiment 6, the transistors of each phase of the inverter circuit 724 are switched on the basis of the modulated wave of each phase based on the carrier wave of each phase different in phase from each other by 120 degrees and the commands of each phase command, and thereby the appearance frequency of the zero voltage vectors can be decreased. As a result, the current pulsations that can be generated at the neutral point of the motor 722 with the outputs of the zero voltage vectors can be decreased, and the loss of the motor 722 can be suppressed.

Figure 33:
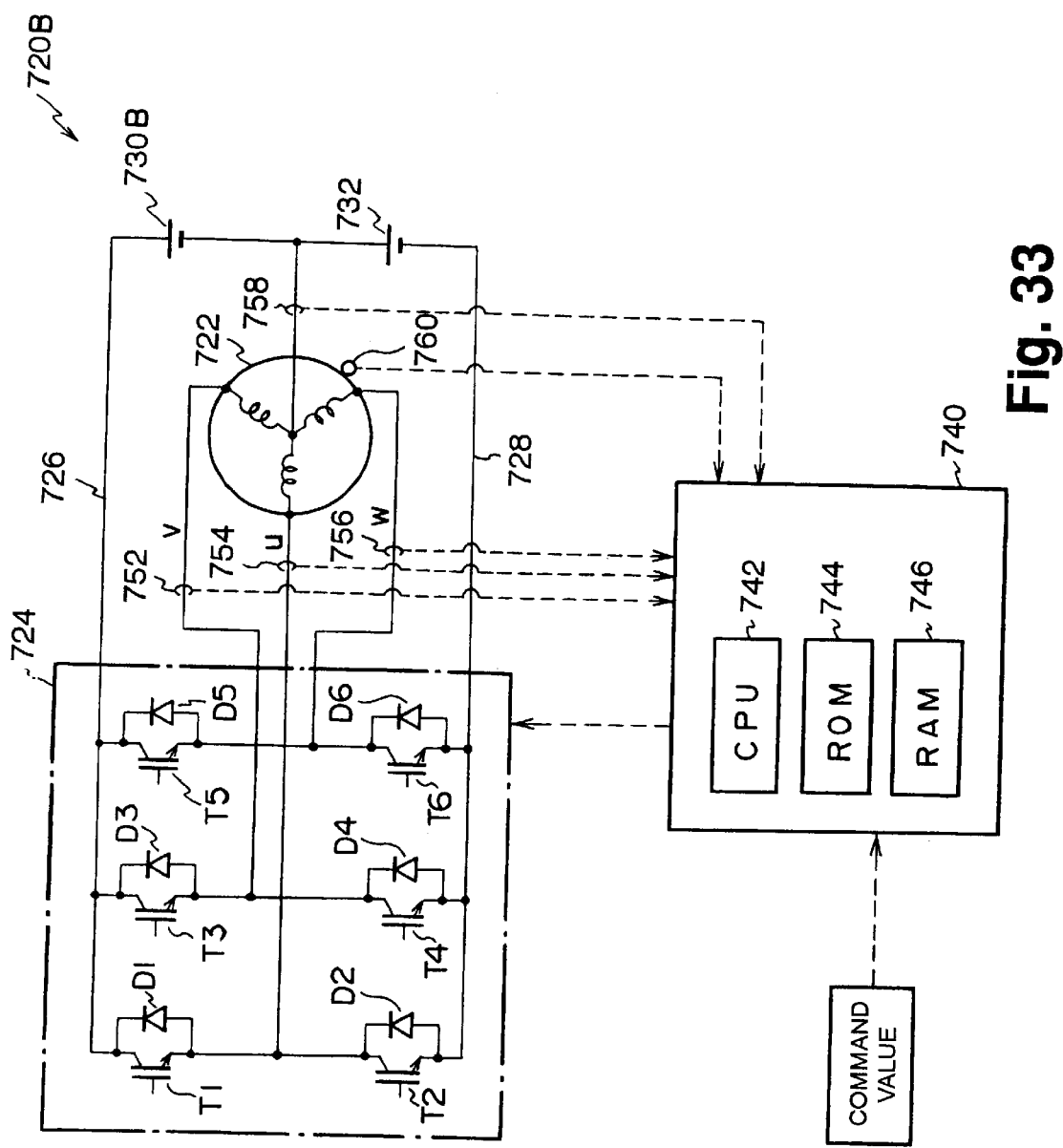
FIG. 33 is a schematic diagram showing an outline of the configuration of a modified mechanical power outputting apparatus 720B.

Although, in the mechanical power outputting apparatus 720 of the embodiment 6, the second direct-current power supply 732 is attached to connect the negative pole bus 728 of the inverter circuit 724 with the neutral point of the motor 722, the second direct-current power supply 732 may be attached to connect the positive pole bus 726 of the inverter circuit 724 with the neutral point of the motor 722. Moreover, although, in the mechanical power outputting apparatus 720 of the embodiment 6, the first direct-current power supply 730 having the voltage V1 being twice as large as the voltage V2 of the second direct-current power supply 732 is attached to connect the positive pole bus 726 with the negative pole bus 728 of the inverter circuit 724, a first direct-current power supply 730B having the same voltage as the voltage V2 of the second direct-voltage power supply 732 may be attached to connect the positive pole bus 726 of the inverter circuit 724 and the neutral point of the motor 722 as the modified mechanical power outputting apparatus 720B of FIG. 33. The reason for this is that the modified mechanical power outputting apparatus 720B is electrically equivalent to the mechanical power outputting apparatus 720 of the embodiment 6.

Figure 34:
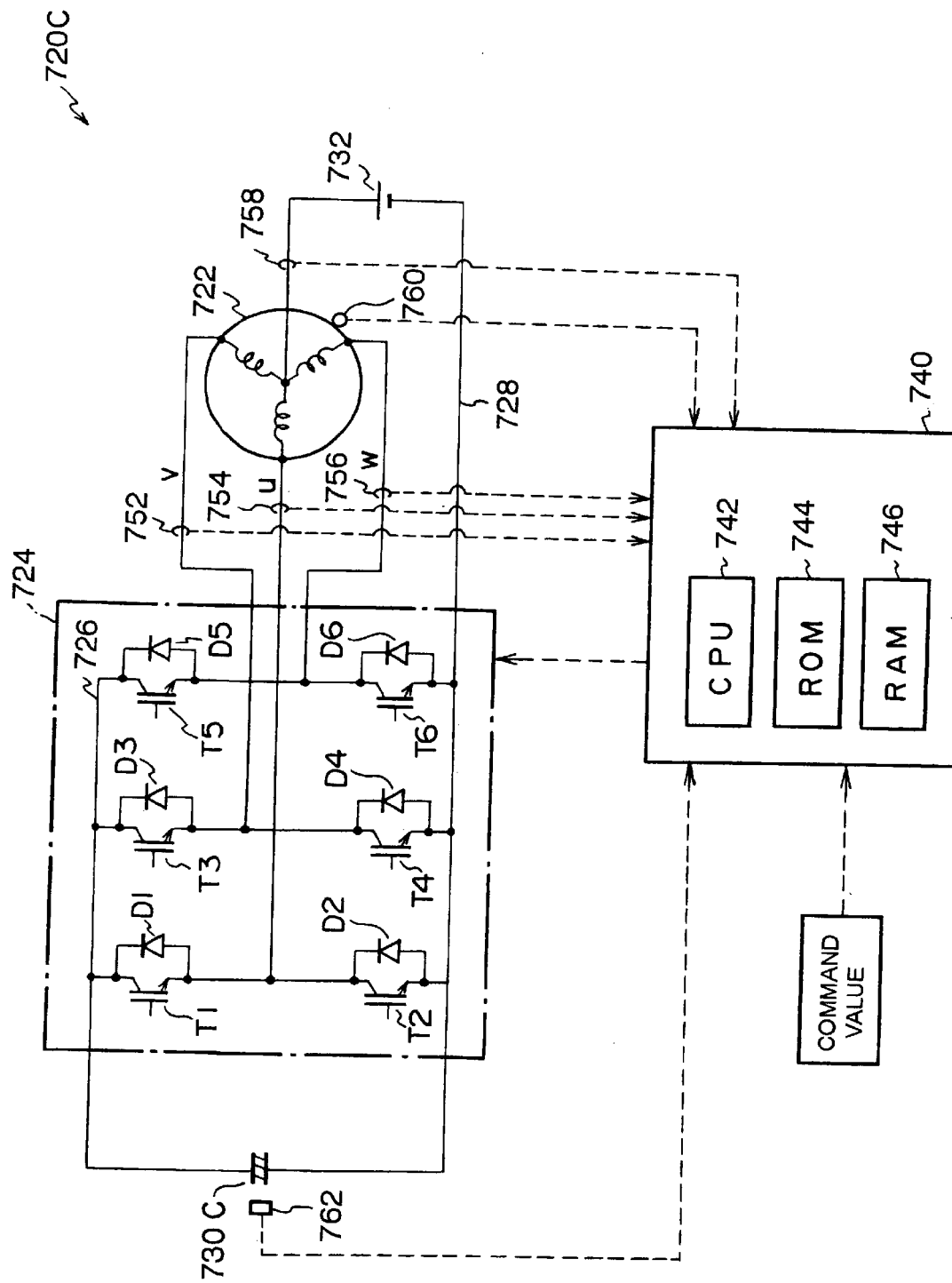
FIG. 34 is a schematic diagram showing an outline of the configuration of another modified mechanical power outputting apparatus 720C.
Figure 35:
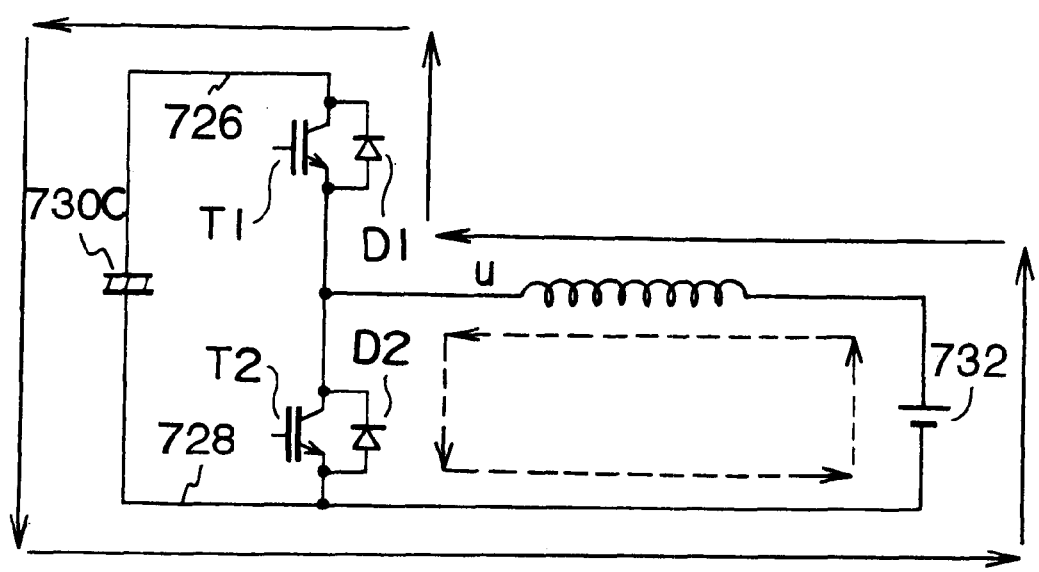
FIG. 35 is a circuit diagram of the mechanical power outputting apparatus 720C of the modified embodiment 6 when the leakage inductance of the three-phase coils of the motor 722 is noticed.

Although, in the mechanical power outputting apparatus 720 of the embodiment 6, the first direct-current power supply 730 connecting the positive pole bus 726 and the negative pole bus 728 of the inverter circuit 724 is provided, a capacitor 730C may be provided in place of the first direct-current power supply 730 as the modified mechanical power outputting apparatus 720C of FIG. 34. Incidentally, the modified mechanical power outputting apparatus 720C shown in FIG. 34 is equipped with a voltage sensor 762 for detecting the voltage Vc between the terminals of the capacitor 730C, and a detection signal from the voltage sensor 762 is inputted to the electronic control unit 740 through the input port thereof. FIG. 35 is the circuit diagram of the modified mechanical power outputting apparatus 720C when the leakage inductance of the three-phase coils of a motor 722 is noticed. The circuit diagram shows a configuration in which the transistors TU1 and TU2 are replaced with one transistor T1 and transistors TU3 and TU4 are replaced with one transistor T2 in the circuit diagram shown in FIG. 27. Consequently, the circuit shown in FIG. 35 can be regarded as a step-up and step-down chopper circuit that steps up the energy of the second direct-current power supply 732 to store it in the capacitor 730C and can charge the second direct-current power supply 732 by means of the electrical potential of the capacitor 730C similarly to the circuit shown in FIG. 27. Because the v-phase and the w-phase of the three-phase coils of the motor 722 can also be regarded as a step-up and step-down chopper circuit like the u-phase thereof, the capacitor 730C can be charged by the execution of the turning on and off of the transistors T2, T4 and T6, and the second direct-current power supply 732 can be charged by means of the electrical potential of the capacitor 730C. Then, the control of the voltage Vc between the terminals of the capacitor 730C and the driving control of the motor 722 can be performed simultaneously by the offsetting of the electrical potential of a pseudo-three-phase alternating current as described with respect to the modified mechanical power outputting apparatus 620C.

Consequently, the modified mechanical power outputting apparatus 720C can perform the control similar to the PWM control of each phase of the mechanical power outputting apparatus 720 of the embodiment 6 by offsetting each phase modulated wave shown in FIG. 31 to the plus side or the minus side, and can control the voltage Vc between the terminals of the capacitor 730C. As a result, the modified mechanical power outputting apparatus 720C can also possess advantages similar to those of the mechanical power outputting apparatus 720 of the embodiment 6.

Figure 36:
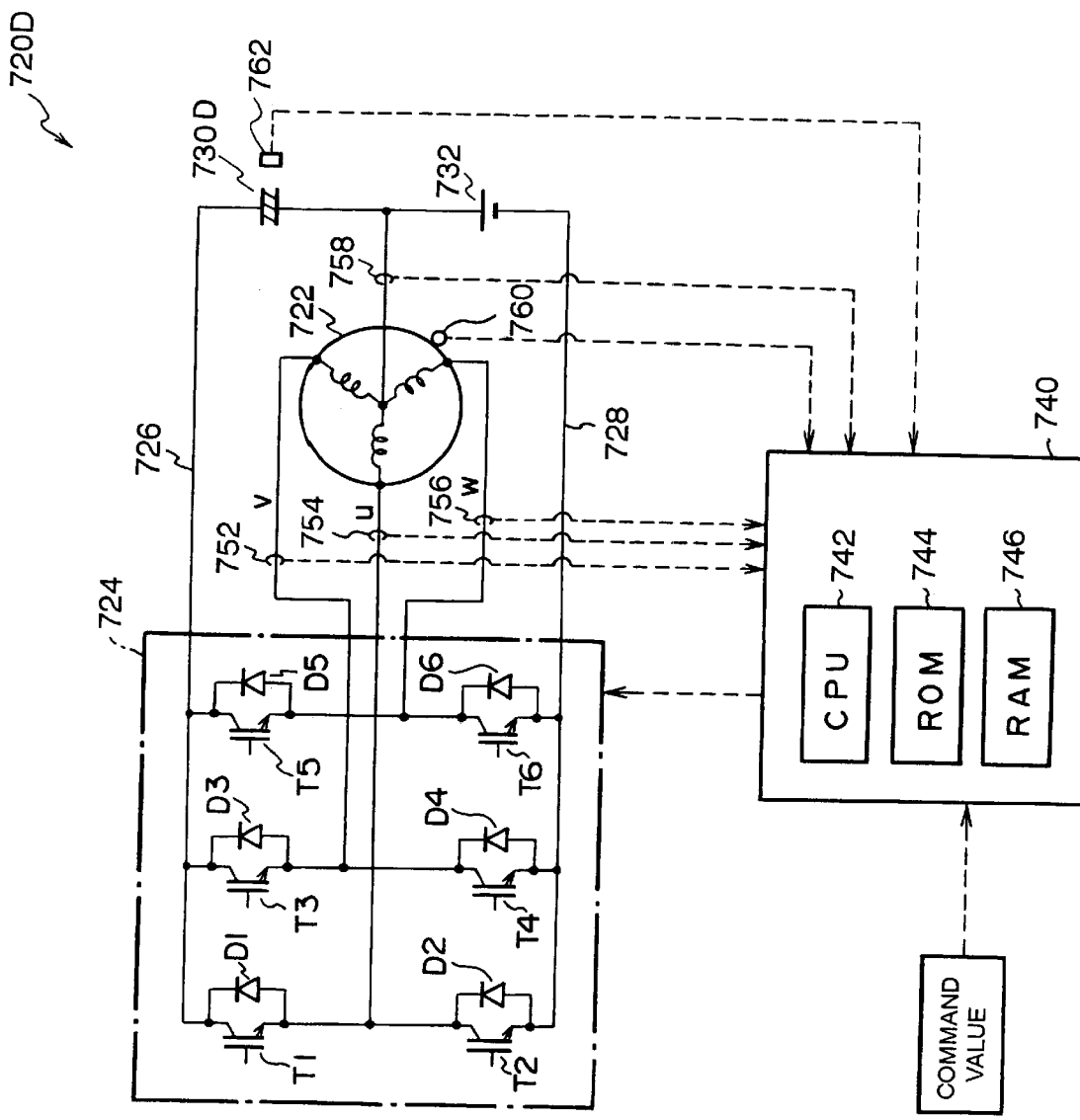
FIG. 36 is a schematic diagram showing an outline of the configuration of still another modified mechanical power outputting apparatus 720D.
Figure 37:
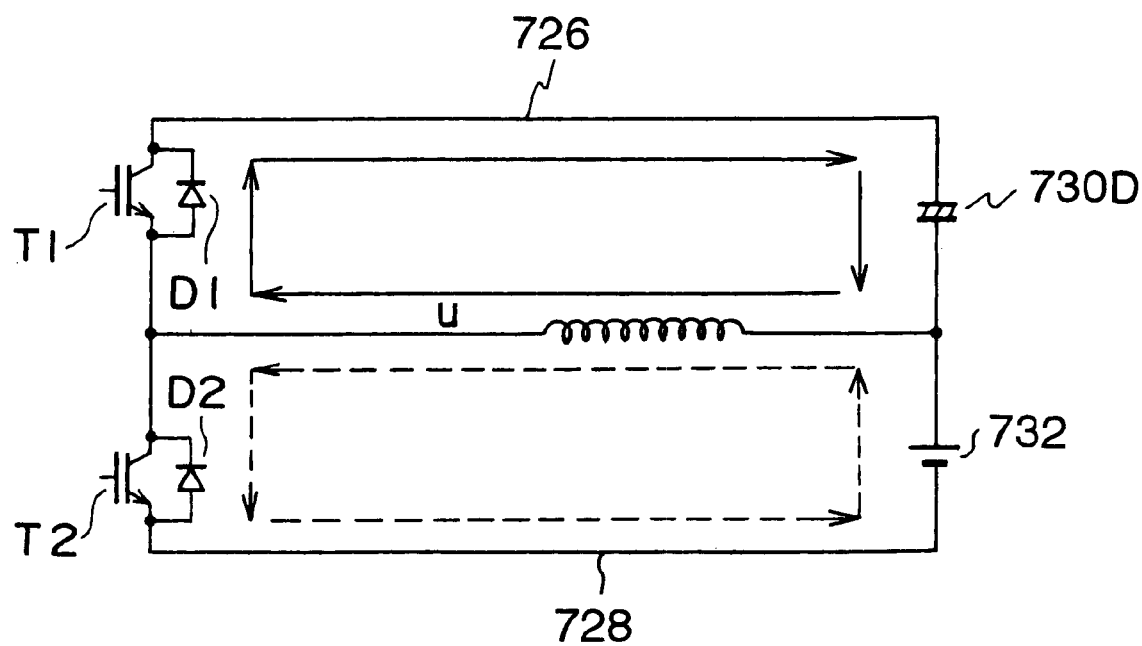
FIG. 37 is a circuit diagram of the mechanical power outputting apparatus 720D of the modified embodiment 6 when the leakage inductance of the three-phase coils of the motor 722 is noticed.

Although the mechanical power outputting apparatus 720 of the embodiment 6 is equipped with the first direct-current power supply 730 connecting the positive pole bus 726 and the negative pole bus 728 of the inverter circuit 724, the mechanical power outputting apparatus may be equipped with a capacitor 730D connecting the positive pole bus 726 of the inverter circuit 724 and the neutral point of the motor 722 in place of the first direct-current power supply 730 as the modified mechanical power outputting apparatus 720D of FIG. 36. Incidentally, the modified mechanical power outputting apparatus 720D shown in FIG. 36 is also equipped with the voltage sensor 762 for detecting the voltage Vc between the terminals of the capacitor 730D, and the detection signal of the voltage sensor 762 is input into the electronic control unit 740 through the input port. FIG. 37 is the circuit diagram of the modified mechanical power outputting apparatus 720D when the leakage inductance of the three-phase coils of the motor 722 is noticed. The circuit diagram shows a configuration in which the transistors TU1 and TU2 are replaced with one transistor T1 and the transistors TU3 and TU4 are replaced with one transistor T2 in the circuit diagram shown in FIG. 29. Consequently, the circuit shown in FIG. 37 can be regarded as a chopper circuit that stores the energy of the second direct-current power supply 732 in the capacitor 730D and can charge the second direct-current power supply 732 by means of the electrical potential of the capacitor 730D similarly to the circuit shown in FIG. 29. Because the v-phase and the w-phase of the three-phase coils of the motor 722 can also be regarded as a chopper circuit like the u-phase thereof, the capacitor 730D can be charged by the execution of the turning on and off of the transistors T1–T6, and the second direct-current power supply 732 can be charged by means of the electrical potential of the capacitor 730D. Then, the control of the voltage Vc between the terminals of the capacitor 730D and the driving control of the motor 722 can be performed simultaneously by the offsetting of the electrical potential of a pseudo-three-phase alternating current as described with respect to the modified mechanical power outputting apparatus 620D.

Consequently, the modified mechanical power outputting apparatus 720D can perform the control similar to the PWM control of each phase of the mechanical power outputting apparatus 720 of the embodiment 6 by offsetting each phase modulated wave shown in FIG. 31 to the plus side or the minus side, and can control the voltage Vc between the terminals of the capacitor 730D. As a result, the modified mechanical power outputting apparatus 720D can also possess advantages similar to those of the mechanical power outputting apparatus 720 of the embodiment 6.

Although, in the mechanical power outputting apparatus 720 of the embodiment 6 and the variations thereof, the phase of the carrier wave of each phase is made to be different from each other by 120 degrees, the phase of the carrier wave of each phase may be made to be different from each other by 360/n when a motor of n-phase is used. Moreover, the phase of the carrier wave of each phase should be within an allowed extent of current pulsations, the phase may be angles within an allowed extent including 120 degrees and 360/n degrees. Furthermore, the phase of the carrier wave of each phase may be any angle as long as it can make the appearance frequency of the zero voltage vectors small.

Although, in the mechanical outputting apparatus 620 of the embodiment 5, the mechanical power outputting apparatus 720 of the embodiment 6, and their variations, a synchronous generation dynamo-electric motor driven by a square wave voltage of a three-phase alternating current is used as the motors 622 and 722, any type of dynamo-electric motor driven by a square wave voltage of a polyphase alternating current may be used.

In the aforesaid, descriptions are given for detailed embodiments as to the implementation of the present invention, but the present invention is not limited to the detailed embodiments, and it is needless to say that the present invention may be implemented by various forms as long as the form does not depart from the subject matter of the invention.

What is claimed is:

1. A mechanical power outputting apparatus for outputting mechanical power, said apparatus comprising:
   a first dynamo-electric motor driven to rotate by a polyphase alternating current;

a first inverter circuit capable of supplying polyphase alternating-current power to said first dynamo-electric motor by switching operation of a plurality of switching elements;

a first direct-current power supply connected with either bus of a positive pole bus and a negative pole bus of said first inverter circuit and a neutral point of said first dynamo-electric motor;

a second dynamo-electric motor driven by a polyphase alternating current to rotate;

a second inverter circuit having a positive pole bus and a negative pole bus connected with the positive pole bus and the negative pole bus of said first inverter circuit, respectively, said second inverter circuit supplying polyphase alternating-current power to said second dynamo-electric motor by the switching operation of the plural switching elements; and an accumulating device connected between the positive pole bus and the negative pole bus of said first inverter circuit, said accumulating device being capable of being charged and discharged.

2. The mechanical power outputting apparatus according to claim 1, said apparatus further comprising a first drive and accumulation controlling circuit for performing driving control of said first dynamo-electric motor and for controlling an accumulated state of said accumulating device.

3. The mechanical power outputting apparatus according to claim 2, wherein said first drive and accumulation controlling circuit controls switching of the plural switching elements of said first inverter circuit so as to regulate the polyphase alternating current to be imposed on said first dynamo-electric motor and so as to regulate the charging and the discharging of said accumulating device.

4. The mechanical power outputting apparatus according to claim 2, wherein said first drive and accumulation controlling circuit controls switching of the plural switching elements of said first inverter circuit so that the polyphase alternating current enabling said first dynamo-electric motor to output target mechanical power is imposed on said first dynamo-electric motor and so that a voltage between terminals of said accumulating device is a target voltage.

5. The mechanical power outputting apparatus according to claim 1, said apparatus further comprising a second direct-current power supply connected between either bus of the positive pole bus and the negative pole bus of said second inverter circuit and the neutral point of said second dynamo-electric motor.

6. The mechanical power outputting apparatus according to claim 5, said apparatus further comprising a second drive and accumulation controlling circuit for performing driving control of said second dynamo-electric motor and for controlling an accumulated state of said accumulating device.

7. The mechanical power outputting apparatus according to claim 6, wherein said second drive and accumulation controlling circuit controls switching of the plural switching elements of said second inverter circuit so as to regulate the polyphase alternating current to be imposed on said second dynamo-electric motor and so as to regulate the charging and the discharging of said accumulating device.

8. The mechanical power outputting apparatus according to claim 6, wherein said second drive and accumulation controlling circuit controls switching of the plural switching elements of said second inverter circuit so that the polyphase alternating current enabling said second dynamo-electric motor to output target mechanical power is imposed on said second dynamo-electric motor and so that a voltage between terminals of said accumulating device is a target voltage.

* * * * *